United States Patent
Joshi et al.

(10) Patent No.: US 9,108,370 B2
(45) Date of Patent: Aug. 18, 2015

(54) MICROGRAVITY FABRICATION AND METALIZATION OF LARGE, LIGHTWEIGHT POLYMERIC BUBBLES AND FILMS FOR SPACE SYSTEM APPLICATIONS

(71) Applicant: Physical Sciences, Inc., Andover, MA (US)

(72) Inventors: Prakash B. Joshi, Andover, MA (US); David B. Oakes, Reading, MA (US); Edward J. Salley, Andover, MA (US); Allan Dokhan, Belmont, MA (US); Kophu Chiang, North Andover, MA (US); Alan Gelb, Boston, MA (US); John Hagge, Laporte, MN (US); B. David Green, Methuen, MA (US)

(73) Assignee: Physical Sciences, Inc., Andover, MA (US)

( * ) Notice: Subject to any disclaimer, the term of this patent is extended or adjusted under 35 U.S.C. 154(b) by 491 days.

(21) Appl. No.: 13/655,240

(22) Filed: Oct. 18, 2012

(65) Prior Publication Data

US 2013/0101770 A1    Apr. 25, 2013

Related U.S. Application Data

(60) Provisional application No. 61/548,932, filed on Oct. 19, 2011.

(51) Int. Cl.
  *B29D 11/00*    (2006.01)
(52) U.S. Cl.
  CPC ..... *B29D 11/00865* (2013.01); *Y10T 428/1355* (2015.01)
(58) Field of Classification Search
  CPC ....................................................... B29D 11/00

USPC .......................... 427/162, 212, 215, 217, 487
See application file for complete search history.

(56) References Cited

U.S. PATENT DOCUMENTS

| | | | |
|---|---|---|---|
| 3,649,059 A * | 3/1972 | Davidson | 248/239 |
| 3,949,125 A * | 4/1976 | Roberts | 428/99 |
| 4,792,811 A * | 12/1988 | Aubry et al. | 343/781 CA |
| 5,223,781 A * | 6/1993 | Criswell et al. | 322/2 R |
| 5,514,217 A * | 5/1996 | Niino et al. | 118/723 MW |
| 5,900,936 A * | 5/1999 | Shirley et al. | 356/520 |
| 5,945,955 A * | 8/1999 | Glover et al. | 343/704 |
| 2005/0100251 A1* | 5/2005 | Havens et al. | 383/107 |
| 2007/0245664 A1* | 10/2007 | Orologio | 52/508 |
| 2009/0108138 A1* | 4/2009 | Mintz et al. | 244/173.3 |
| 2009/0292075 A1* | 11/2009 | Tamai et al. | 525/221 |
| 2010/0096569 A1* | 4/2010 | Nguyen et al. | 250/505.1 |

OTHER PUBLICATIONS

Carroll, W.F., et al., "Polymers in Solar Energy: Applications and Opportunities". In Polymers in Solar Energy Utilization; Gebelein, C., et al.; ACS Symposium Series; American Chemical Society; Washington, DC, 1983, pp. 3-18.*

(Continued)

*Primary Examiner* — Bret Chen
(74) *Attorney, Agent, or Firm* — Proskauer Rose LLP

(57) ABSTRACT

A method of forming a metalized polymeric bubble in a space, microgravity environment is described. A liquid polymer bubble having a predetermined diameter is formed from a mixture comprising a liquid polymer and at least one of a UV curing material, a stabilizer, a UV absorber, or a surfactant. The liquid polymer bubble is cured with radiation to form a rigid polymer bubble. The rigid polymer bubble is then metalized with a metal to form the metalized polymeric bubble.

15 Claims, 24 Drawing Sheets

(56) References Cited

OTHER PUBLICATIONS

Hutchings, M., et al., "Proof of the Double Bubble Conjecture," Annals of Mathematics, 155, 2002, pp. 459-489.

Joshi, P.B., et al., "Microgravity Fabrication of Large Area, Ultra Lightweight, High Precision Mirrors for Very Large Aperture, Earth-Viewing Systems," Final Program Review Presented to National Reconnaissance Organization, Feb. 28, 2003, pp. VG03-042-144.

* cited by examiner

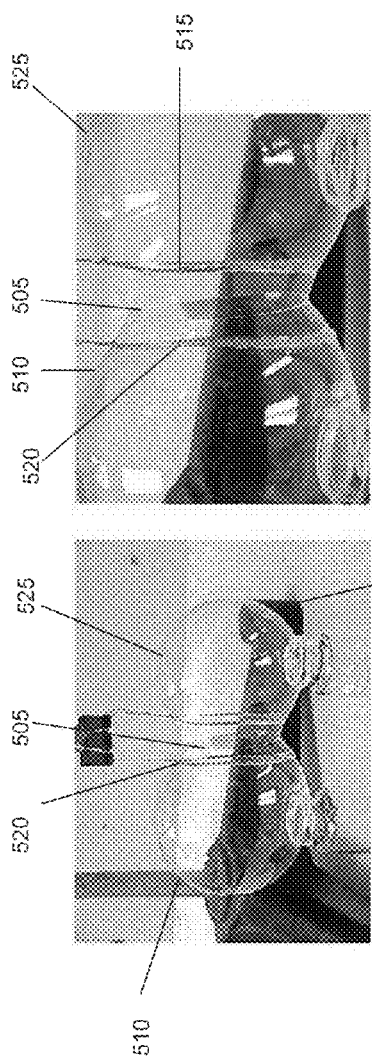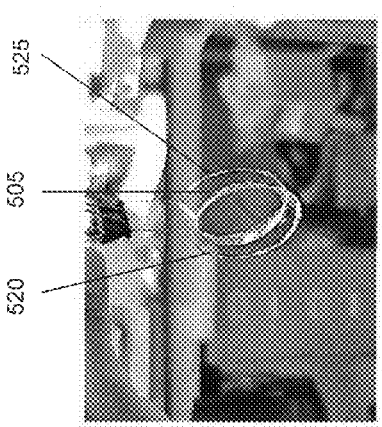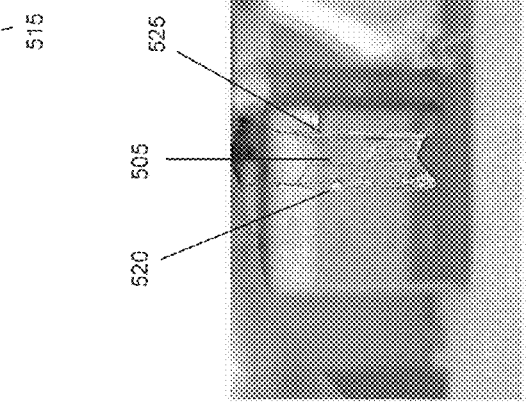
FIG. 5A  FIG. 5B  FIG. 5C  FIG. 5D

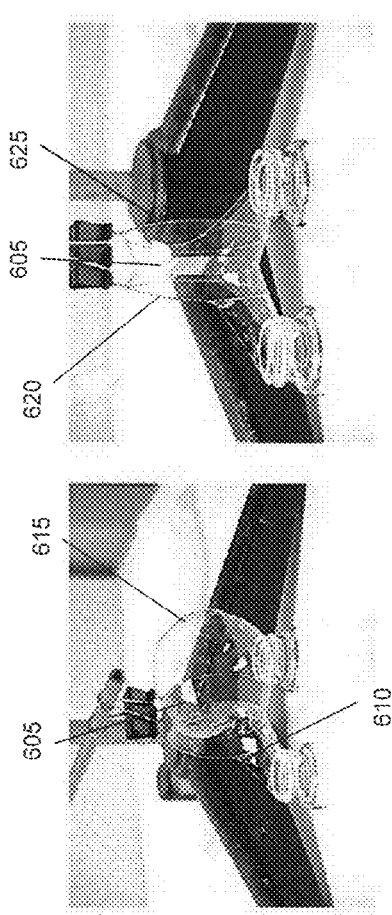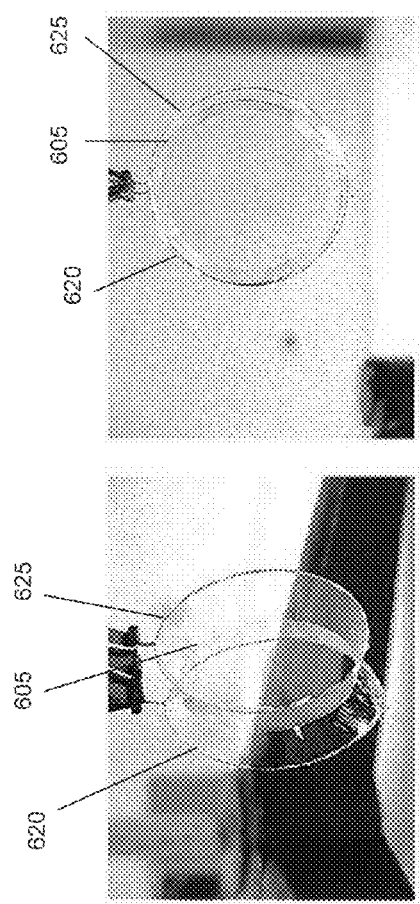

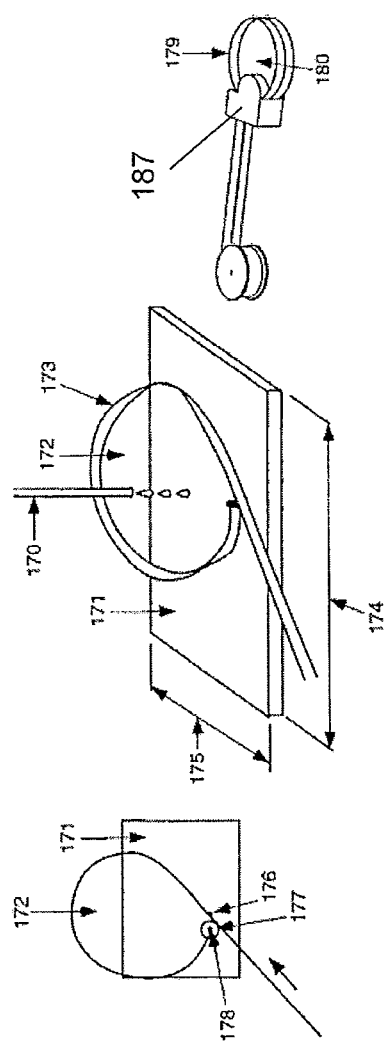

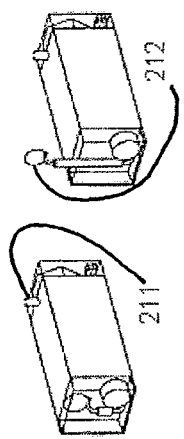
FIG. 14A
FIG. 14B
FIG. 14C
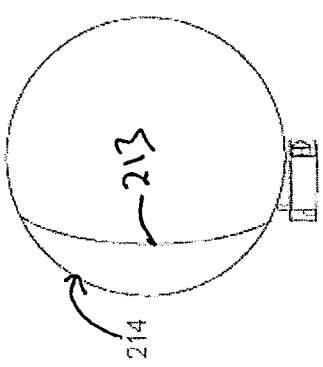
FIG. 14D
FIG. 14E
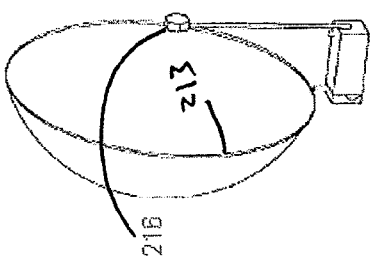
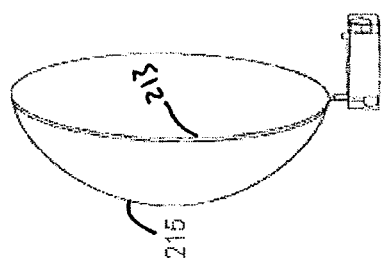
FIG. 14F
FIG. 14G

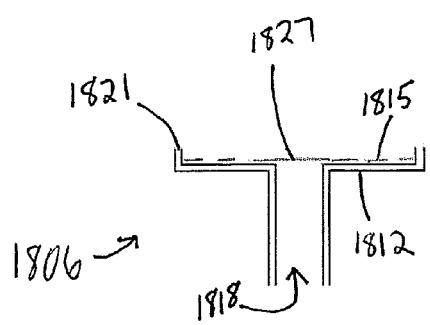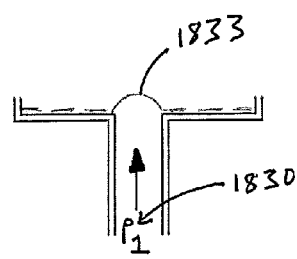
FIG. 18A  FIG. 18B
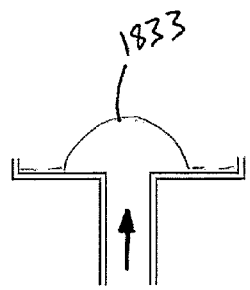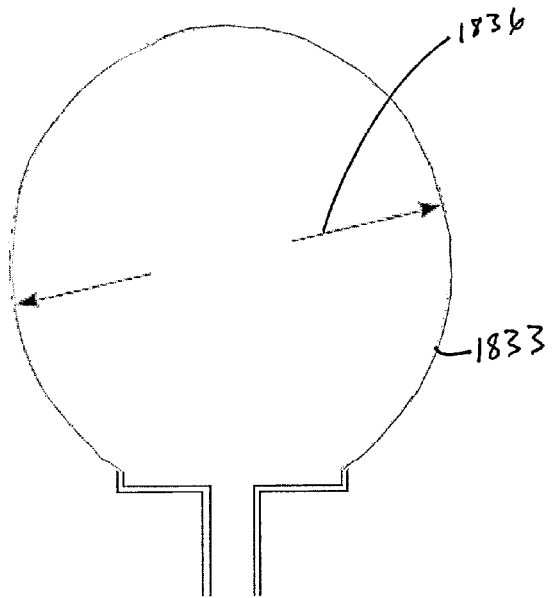
FIG. 18C  FIG. 18D

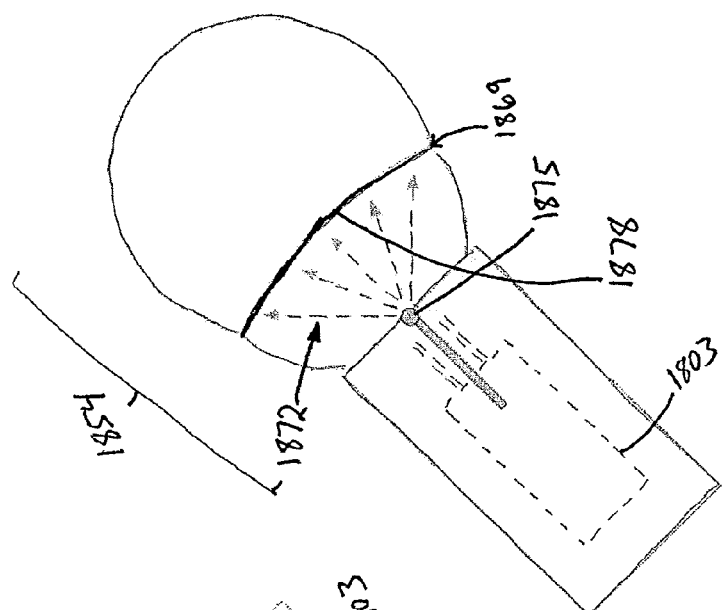
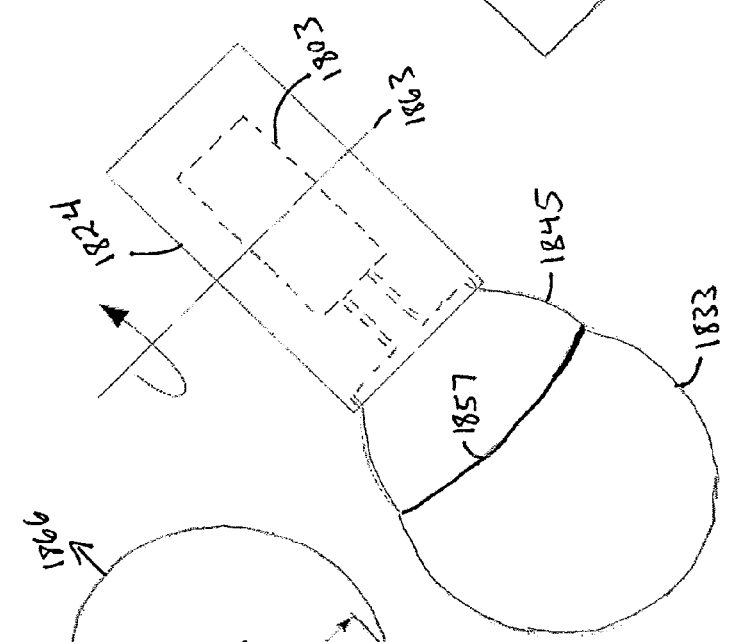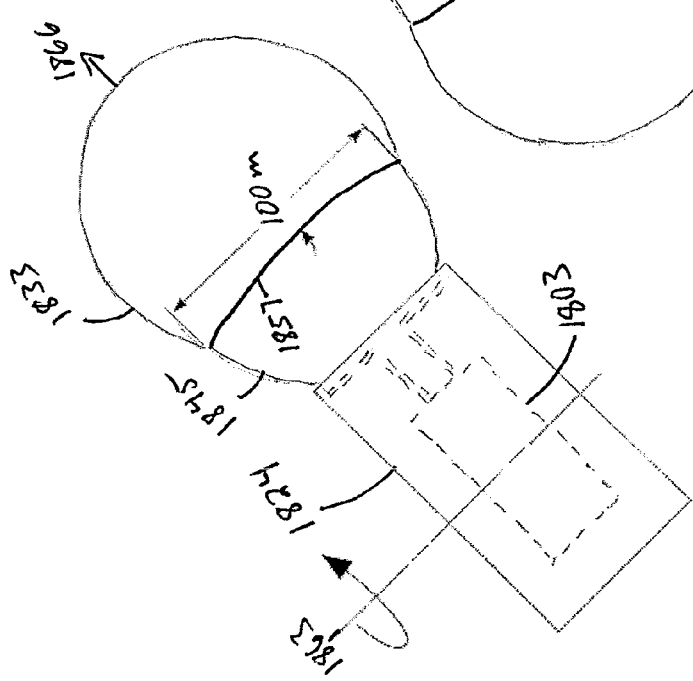

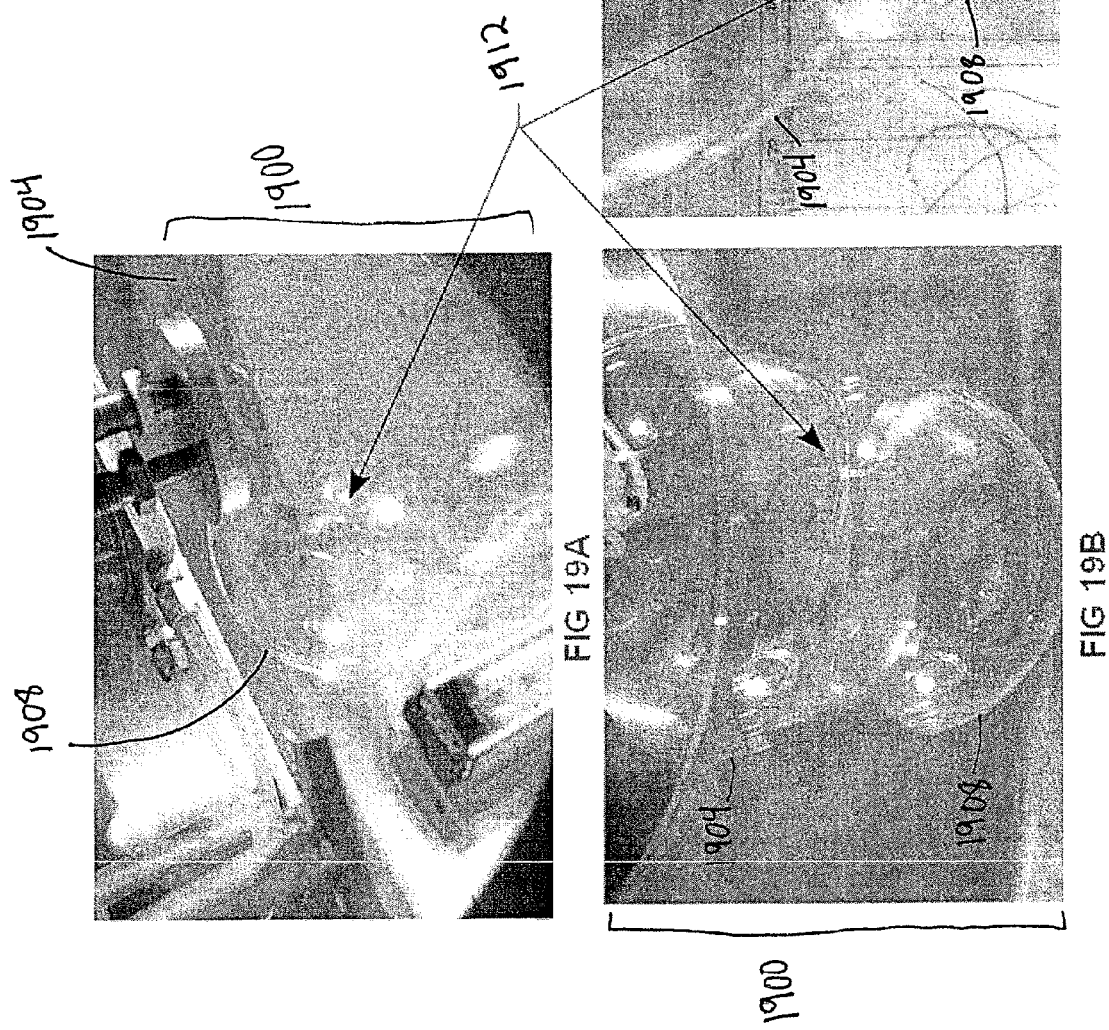

MICROGRAVITY FABRICATION AND METALIZATION OF LARGE, LIGHTWEIGHT POLYMERIC BUBBLES AND FILMS FOR SPACE SYSTEM APPLICATIONS

CROSS REFERENCE TO RELATED APPLICATION

This application claims the benefit of and priority to U.S. Provisional Patent Application No. 61/548,932, filed Oct. 19, 2011, which is owned by the assignee of interest and the entire disclosure of which is incorporated herein by reference.

GOVERNMENT RIGHTS

The invention was made with government support under National Reconnaissance Office contract number NRO000-02-C-0370. The invention was made with government support under Missile Defense Agency/Air Force contract number HQ0006-06-C-7457. The invention was made with government support under Defense Advanced Research Projects Agency contract number HR0011-07-P-0007. The invention was made with government support under the Air Force Research laboratory contract number FA9453-09-M-0161. The government has certain rights in the invention.

FIELD OF THE INVENTION

The invention relates generally to polymeric bubbles and films, and more particularly to microgravity fabrication and metalization of large, lightweight polymeric bubbles and films for space system applications.

BACKGROUND OF THE INVENTION

The size of structures and systems that can be used in space is currently limited by the volume and mass of the payloads that can be accommodated within the launch vehicle envelope and its launch weight capacity. Forming structures in a space environment can be desirable. The requirements for building or forming large structures (e.g., hundreds of meters in length) in a space environment can be very different from forming structures in an earth environment because the physical environment on the surface of earth (e.g., gravity, presence of atmosphere and its pressure, solar spectrum, thermal conditions) are different from the orbital space environment (e.g., near-absence of gravity, near-vacuum, certain solar UV bands, thermal cycling, solar wind, trapped and cosmic radiation, and atomic oxygen in low earth orbits).

SUMMARY OF THE INVENTION

Advantages of the invention include providing a low cost method of fabricating large area microwave reflectors (up to ~100 meters in diameter) from small spacecraft (~1-2 meters) in space and eliminating the need to transport bulky and expensive equipment into space. Another advantage of the invention is that bubbles or films can be used. Another advantage of the invention is the thinness of the liquid polymer bubbles (e.g., down to less than approximately one micron). Another advantage of the invention is the light weight of the liquid polymer bubbles and the areal density of the bubble making system, e.g. the areal density can be about 0.02 kg/m$^2$. Another advantage of the invention is the ability to achieve a wide range of reflector sizes. Another advantage of the invention is that the reflector size can change by varying easily controllable parameters, e.g., as described below. Another advantage of the invention is that bubbles can be repeatedly deployed, e.g. if a bubble pops another one can be constructed in its place. Another advantage of the invention is that the films can be spun into parabolas while they are still liquid, if desired.

In one aspect, the invention involves a method of forming a metalized polymeric bubble in a space, microgravity environment. The method involves forming a liquid polymer bubble having a predetermined diameter from a mixture comprising a liquid polymer and at least one of a UV curing material, a stabilizer, a UV absorber, or a surfactant. The method also involves curing the liquid polymer bubble with solar UV radiation to form a rigid polymer bubble. The method also involves metalizing the rigid polymer bubble with a metal to form the metalized polymeric bubble.

In some embodiments, the predetermined diameter of the liquid polymer bubble is at least approximately 0.5 meters. In some embodiments, the rigid polymer bubble is metalized on an interior surface of the rigid polymer bubble. In some embodiments, the rigid polymer bubble is metalized on an exterior surface of the rigid polymer bubble.

In some embodiments, the liquid polymer comprises at least one of castor oil, non-stoichiomeric polypropylene glycol monomethacrylate and isophorone diisocyanate, conathane, solithane, cycloaliphatic epoxy, or cycloaliphatic epoxy and HHPA anhydride. In some embodiments, the surfactant is a polar surfactant. In some embodiments, the surfactant comprises FC430. In some embodiments, the UV curing material is benzophenone. In some embodiments, the stabilizer is a hindered amine light stabilizer. In some embodiments, the absorber is hydroxyphenyl-s-triazine.

In some embodiments, the liquid polymer bubble is formed by striking a film of the mixture across an injector port disposed within a plate and pressurizing the film with a gas. In some embodiments, the gas comprises at least one of nitrogen, argon, xenon, or sulfur hexafluoride. In some embodiments, a wall thickness of the rigid polymer bubble is less than approximately 1 micron. In some embodiments, the metalizing step comprises evaporating the metal from a source onto the rigid polymer bubble. In some embodiments, the metal comprises at least one of cobalt, chromium, iridium, iron, molybdenum, rhenium, tungsten, osmium, nickel, zinc, copper, brass, nichrome, or aluminum. In some embodiments, the metal is disposed on a substantial portion of either the internal or external surface of the rigid polymer bubble. In some embodiments, the mass of the metal coating is approximately 10% of the mass of the polymeric bubble.

In some embodiments, the method further involves forming another liquid polymer bubble from a mixture comprising at least two of a liquid polymer, a UV curing material, a stabilizer, a UV absorber, or a surfactant. In some embodiments, the method further involves intersecting the two liquid polymer bubbles. In some embodiments, the method further involves isolating a surface of intersection between the two liquid polymer bubbles.

In some embodiments, the two bubbles are the same size and the surface of intersection is flat. In some embodiments, the two bubbles are different sizes and the surface of intersection is spherically curved. In some embodiments, the method also involves passing the liquid polymer bubble through a first ring and passing the other liquid polymer bubble through a second ring located adjacent to the first ring. In some embodiments, the isolating step comprises passing an electrical current through the first and second rings to excise unneeded portions of the liquid polymer bubbles. In some embodiments, the radiation is solar radiation.

In some embodiments the two bubbles are formed successively on an inflation assembly with the other liquid polymer bubble formed substantially inside the liquid polymer bubble. In some embodiments, the inflation pressure within each of the two bubbles is approximately $10^{-6}$ to $10^{-5}$ Ton. In some embodiments, the method also involves moving the liquid polymer bubble such that only a portion of the other liquid polymer bubble remains inside the liquid polymer bubble. In some embodiments, the surface of intersection has a diameter of approximately 100 meters. In some embodiments, the surface of intersection has a radius of curvature of approximately 150 meters. In some embodiments, moving the liquid polymer bubble further comprises applying a force around an exterior perimeter of the liquid polymer bubble. In some embodiments, the force is provided by means of an annular gas jet. In some embodiments, moving the liquid polymer bubble further comprises rotating the two bubbles at an angular speed. In some embodiments, metalizing the rigid polymeric bubble comprises metalizing the surface of intersection to form a metalized surface of intersection.

In another aspect, the invention involves a method of forming a metalized polymer film in a space, microgravity environment. The method involves casting a liquid polymer film across an aperture in an object, the liquid polymer film comprising a mixture of a liquid polymer and at least one of a UV curing material, a stabilizer, a UV absorber, or a surfactant. The method further involves expanding the aperture to a predetermined size. The method further involves curing the liquid polymer film with radiation to form a rigid polymer film. The method further involves metalizing the rigid polymer film with a metal on at least one surface of the rigid polymer film to form the metalized polymer film.

In some embodiments, the method also involves spinning the object on an axis that is normal to the axis of symmetry of the aperture when the aperture has reached the predetermined size to form a parabolic film. In some embodiments, the method also involves spinning the object at a rate to realize a predetermined focal length. In some embodiments, the aperture is substantially circular. In some embodiments, the predetermined size is a length of at least approximately 0.5 meters.

In some embodiments, the liquid polymer comprises at least one of castor oil, non-stoichiomeric polypropylene glycol monomethacrylate and isophorone diisocyanate, conathane, solithane, cycloaliphatic epoxy, or cycloaliphatic epoxy and HHPA anhydride. In some embodiments, the surfactant is a polar surfactant. In some embodiments, the surfactant comprises FC430. In some embodiments, UV curing material is benzophenone. In some embodiments, the stabilizer is a hindered amine light stabilizer. In some embodiments, the absorber is hydroxyphenyl-s-triazine.

In some embodiments, a thickness of the metalized film is less than approximately 1 micron. In some embodiments, the metalizing step comprises evaporating the metal from a source onto the rigid polymer film. In some embodiments, the metalizing step comprises dipping the rigid polymer bubble into the metal. In some embodiments, the metal comprises at least one of cobalt, chromium, iridium, iron, molybdenum, rhenium, tungsten, osmium, nickel, zinc, copper, brass, nichrome, or aluminum. In some embodiments, the mass of the metal is approximately 10% of the mass of the polymeric film.

In some embodiments, the method of forming a metalized polymeric bubble in a space, microgravity environment further comprises using the metalized polymeric bubble as a large aperture microwave reflector, as an antenna onboard a satellite, for space optics, as a calibration source for ground sensors, as a calibration source for space sensors, as an optical target, as a solar sail, or as a drag surface for a deorbiting spacecraft. In some embodiments, the method further comprises using the metalized surface of intersection as a large aperture microwave reflector, as an antenna onboard a satellite, for space optics, as a calibration source for ground sensors, as a calibration source for space sensors, as an optical target, as a solar sail, or as a drag surface for a deorbiting spacecraft.

In some embodiments, the method of forming a metalized polymer film in a space, microgravity environment further comprises using the metalized polymer film as a large aperture microwave reflector, as an antenna onboard a satellite, for space optics, as a calibration source for ground sensors, as a calibration source for space sensors, as an optical target, as a solar sail, or as a drag surface for a deorbiting spacecraft.

In another aspect, the invention involves a method of using a metalized polymeric bubble as a decoy in a low earth orbit, microgravity environment. The method involves deploying more than one metalized polymeric bubble from a spacecraft such that the spacecraft and the metalized polymeric bubbles appear substantially similar to a spacecraft detector.

BRIEF DESCRIPTION OF THE DRAWINGS

FIGS. 5A-5D illustrate a method of isolating a surface of intersection of two liquid polymer bubbles, according to an illustrative embodiment of the invention.

FIGS. 6A-6D illustrate a method of isolating a surface of intersection of two liquid polymer bubbles, according to an illustrative embodiment of the invention.

FIGS. 8A-8C show a diagram of a method of expanding a hoop to form a large area film in space, according to an illustrative embodiment of the invention.

FIGS. 14A-14G show a diagram of fabricating large area microwave reflectors/antennas in space, deployed from a nanospacecraft, according to an illustrative embodiment of the invention.

FIGS. 18A-18K show a diagram of a method of fabricating a RF reflector in space using two polymer bubbles, according to an illustrative embodiment of the invention.

FIGS. 19A-19C show diagrams of two intersecting polymer bubbles, according to an illustrative embodiment of the invention.

DETAILED DESCRIPTION

Figure 1:
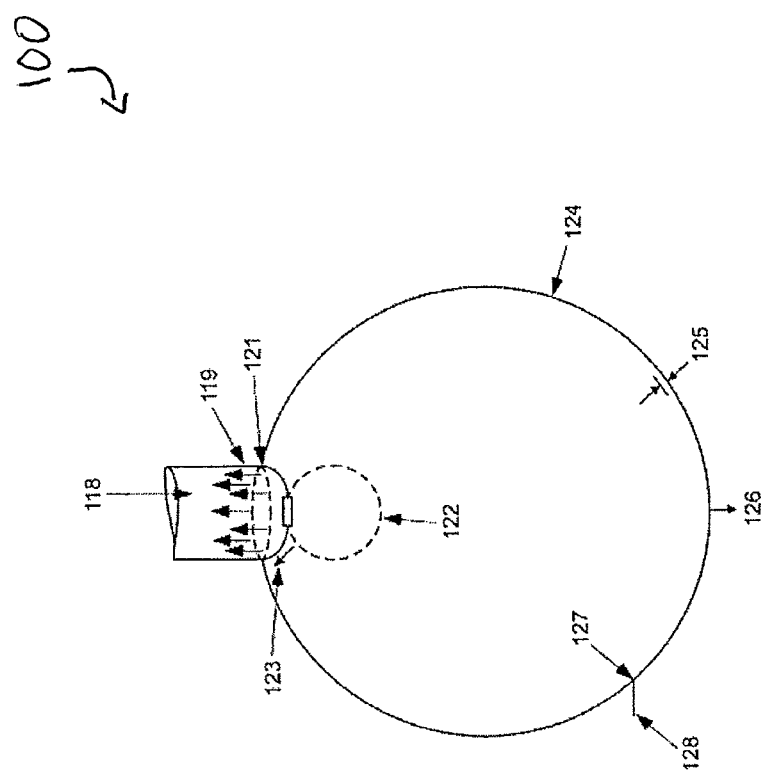
FIG. 1 is a diagram of a polymer bubble attached to an injector port, according to an illustrative embodiment of the invention.

Generally, the invention features fabrication of very large scale (e.g., tens of meters in diameter to hundreds of meters in diameter), ultra-lightweight spherical reflecting bubbles and/or flat, spherical, circular, curved, or parabolic reflecting films in space microgravity or low earth orbit ("LEO").

Generally, the invention also features forming liquid polymer bubbles in space microgravity or LEO microgravity (e.g., gravitational forces that are not identically zero but are very close to zero) space environment, curing the bubbles using solar irradiation (or if located at a position in space where the sun is unavailable, curing the bubbles using illumination onboard the spacecraft), or the thermal environment and metalizing the internal or external surface of the bubbles. The metalization can involve applying a thin metal coating to a surface of the bubbles. The thin metal coating can improve the surface properties of the bubble such as optical properties. When the metalization is applied to the external surface of the bubble, the metalization can improve resistance to corrosion due to space environmental degradation.

Generally, the invention can also include forming flat, curved, concave, convex, spherical, or parabolic liquid polymer films in microgravity space environment or LEO, curing the films with solar irradiation, and metalizing at least one surface of the flat, spherical, curved, concave, or parabolic film. Each of these embodiments can be accomplished in near earth, near-planet, or deep space under appropriate thermal conditions.

Generally, flat films can be formed by intersecting two bubbles of identical size, while spherically curved films can be formed by intersecting two bubbles of dissimilar size. In some embodiments, flat films can be formed by casting a liquid polymer film across an aperture in an object and adjusting the aperture to a predetermined size. The flat film can be made parabolic or curved in shape by rotating the spacecraft about an axis that is normal to the axis of the parabola or film prior to curing the film (e.g., spinning the object on an axis that is normal to the axis of symmetry of the aperture when the aperture has reached the predetermined size to form the parabolic film.

The large scale bubbles and films can be used in a variety of different applications. For example, large scale bubbles and films can be used for large aperture microwave reflectors and antennas onboard satellites, large aperture space optics, calibration sources for ground and space-based sensors, space optics, optical targets, solar sails for propulsion, drag surfaces for deorbiting spacecraft, and defensive mechanisms such as decoys. The quality of the optic can depend on the applications. For example, for visible or ultraviolet wavelengths (e.g., approximately 500 nm), the surface can be ultrasmooth with very few imperfections. For IR/microwave optics, the surface quality of the metalized bubble doesn't have to be as high as the quality for visible wavelengths. Surface imperfections are tolerable for IR/microwave optics.

Materials, processes, and concepts of operation can enable deployment of very large structures in space as part of large aperture telescope systems, calibration targets, large area sails for solar propulsion, large area drag devices for deorbiting spacecraft from mid and high earth orbits, and components of defensive counterspace.

Generally, the invention, in one embodiment, features a method of forming a metalized polymeric bubble in a space, microgravity environment. A liquid polymer bubble having a predetermined diameter can be formed from a mixture comprising a liquid polymer and at least one of a UV curing material, a stabilizer, a UV absorber, or a surfactant. The liquid polymer bubble can be cured with radiation, for example solar radiation, to form a rigid polymer bubble. The rigid polymer bubble can be metalized with a metal to form the metalized polymeric bubble.

The liquid polymer can have a very low vapor pressure so that the polymer will not evaporate too quickly. For example, the liquid polymer can have a vapor pressure of less than approximately 0.1 Ton at approximately 20° C.

The concept of large area, ultra-lightweight bubbles and films for space applications is based on, for example, the liquid formulations shown in Table 1. Table 1 shows candidate UV-curable liquid polymers, and epoxy (CY 179), an acrylate/urethane-like mixture (PPGMM/IPDI), and thermally curable urethane-based liquids used in electronic circuit board coatings (Solithane, Conathatne). FC430 (15 wt.

%), a fluoro polymer, available from the 3M Company can be used a polar surfactant. The surfactant can have a positive head and a negative tail at the surface to provide stability to the liquid polymer bubble. In some embodiments, the surfactant can have positive and negative dipoles. Dipole-dipole interactions can provide stability to the liquid polymer bubble.

The UV-curing material can be benzophenone. Proper balance of the UV-curing materials and the stabilizers/absorbers is critical. Too little UV-cure material will not sufficiently solidify the film. Too much UV-cure material can leave too high residual stresses in the cured film, making it prone to cracks and their propagation. The proper balance of the UV-curing materials and the stabilizers/absorbers can be determined by a trial and error method.

Radical-scavenging UV stabilizers such as Hindered Amine Light Stabilizers ("HALS") that do not interfere with the initiators and the UV curing process, and UV-absorbers such as hydroxyphenyl-s-triazine can also be used as additives to retard the degradation of bubble materials due to long solar UV exposure in space. The walls of the polymer bubble are so thin that light can pass right through the bubble. The UV-curing material helps absorb UV light so that the polymer bubble can cure (e.g., become rigid).

polyatomic gas sulfur hexafluoride ($SF_6$) is a better pressurant than monatomic argon. In some embodiments, the wall thickness of the rigid polymer bubble is approximately 0.5 microns, 0.4 microns, 0.3 microns, 0.2 microns, or 0.1 microns.

The size of the liquid polymer bubble can vary depending on the application. For example, if the liquid polymer bubble is being used as a decoy, the bubble should be approximately the same size as a satellite or approximately 1 meter. In some embodiments, if the liquid polymer bubble is being used as a decoy, the bubble should be a few times the size of the satellite or approximately 10 meters. If the liquid polymer bubble is being used as a sphere for solar propulsion then the bubble can be approximately 1 kilometer in diameter. If the liquid polymer bubble is being used as a microwave reflector deployed from a small spacecraft (e.g., a CubeSat), the bubble can have a predetermined diameter of at least approximately half a meter.

In some embodiments, the liquid polymer bubble can have a predetermined diameter of 1 meter, 10 meters, 100 meters, or 1000 meters or any other diameter.

FIG. 1 is a diagram 100 of a polymer bubble 124 attached to an injector port 121, according to an illustrative embodiment of the invention. The injector port 121 can be placed at the center of a circular plate (not shown). Gas 118 can be used

TABLE 1

Formulations for UV-Curable Polymeric Bubbles and Films.

| | Viscosity cPs | | Surface | Vapor | | |
| --- | --- | --- | --- | --- | --- | --- |
| | Initial | W/FC430 15W/O | Tension (Dynes/cm) | Pressure (Torr) | Density ($g/cm^3$) | Cure Method |
| Castor Oil | 694 | 1061 | 39 at 20 C. | <0.1 at 20 C. | 0.96 | FC430 Not curable |
| Non-Stoichiomeric Polypropylene glycol monomethacrylate (PPGMM) + isophorone diisocyanate (IPDI) | 690 | 1100 | 33.3 at 20 C. | $3 \times 10^{-4}$ at 20 C. | 1.056 | FC430 +PI +UV |
| Conathane | 172 | 580 | N/A | N/A | ~1.07 | Thermal |
| Solithane | 1000 | | N/A | N/A | ~1.03 | Thermal |
| CY 179 epoxy | 540 | 1410 | 30-45 at 20 C. | <0.01 at 20 C. | 1.17 | FC430 +PI +UV |
| Cycloaliphatic (CY179) epoxy + HHPA anhydride | — | — | 30-45 at 20 C. | <0.01 at 20 C. | 1.17 | Thermal |

As shown in Table 1, the liquid polymer mixture can be or can include at least one of castor oil, non-stoichiomeric polypropylene glycol monomethacrylate and isophorone diisocyanate, conathane, solithane, cycloaliphatic epoxy, or cycloaliphatic epoxy and HHPA anhydride. The surfactant can be a polar surfactant, for example, FC430 available from the 3M Company. The stabilizer can be a hindered amine light stabilizer.

In some embodiments, the bubble can be formed by striking a film of the mixture across an injector port disposed within a plate and pressurizing the film with a gas. The gas used to pressurize the film and form the bubble can be, for example, nitrogen, argon, xenon, sulfur hexafluoride, or any combination thereof. Because the bubble wall of the cured, rigid or solid polymer bubble is thin (e.g., the bubble wall has a wall thickness of less than approximately 1 micron), the gas should comprise larger atoms or molecules so that they don't diffuse out of the thin bubble wall. In some embodiments, the to pressurize a film cast on the injector port 121 to form the polymer bubble 124. The direction of expansion of the polymer bubble is shown by arrow 123 as it grows from a state of partial inflation 122. There are at least two forces that are being applied to the bubble. The first force is gravity, shown by arrow 126. The second force is the surface tension, shown by arrows 119, that acts in the opposite direction of gravity. The gravitational force is pulling the bubble 124 away from the injector port 121 and can eventually detach the bubble 124 from the injector port 121. The surface tension force is acting to keep the bubble 124 attached to the injector port 121. The bubble 124 has an inner surface 127 and an outer surface 128. The thickness 125 of the bubble 124 wall is the difference between the outer surface 128 and the inner surface 127.

Based on these two competing forces and variety of other variables, such as properties of the liquid mixture, the size of a bubble in microgravity can be estimated based on a measurement of the variables on earth. EQNS. 1 and 2 show that the size scale is proportional to the inverse square root of gravity by balancing the weight of the bubble against the surface tension force around the circumference of the injector port.

$$2\pi r \gamma = 4\pi R_b^2 t \rho g \qquad \text{EQN. 1}$$

$$R_{b_{max}} = \sqrt{\frac{r\gamma}{2\rho g t}} \propto \frac{1}{\sqrt{g}} \qquad \text{EQN. 2}$$

In EQNS. 1 and 2, r is the radius of the injector port and $2\pi r$ is the circumference of the injector port. $\gamma$ is the surface tension measured in force per unit length. The right hand side of EQN. 1 is the weight of the bubble, where the thickness of the bubble is represented by t, the density of the mixture is represented by $\rho$ and gravity is represented by g. $R_b$ is the radius of the bubble. Therefore, the maximum radius of the bubble $R_{b(max)}$ is shown by EQN. 2. In EQN. 2, $R_{b(max)}$ is proportional to the inverse square root of gravity (g).

Figures 2A, 2B:
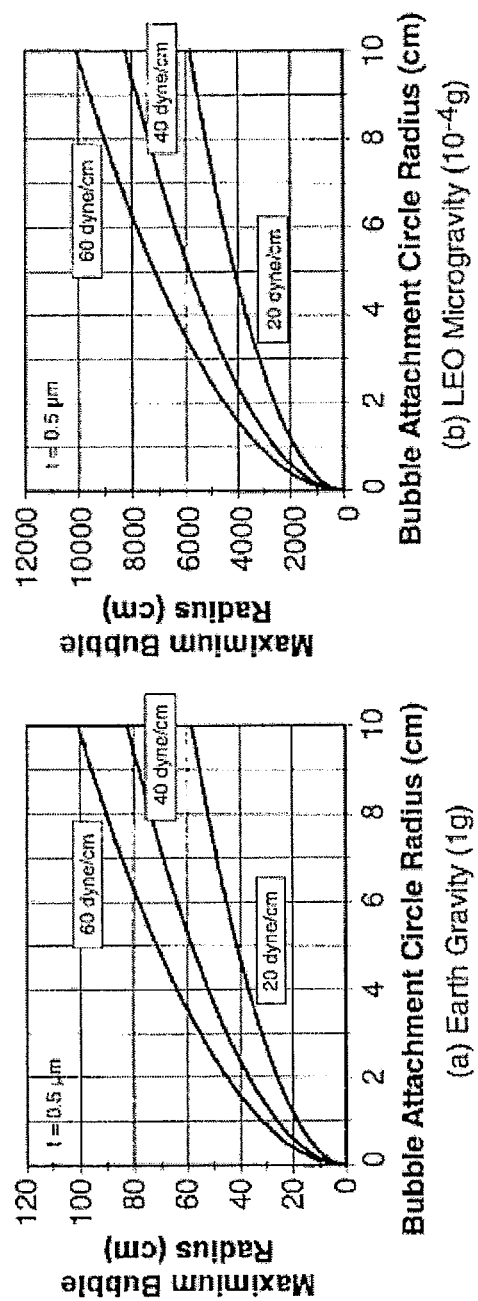
FIGS. 2A and 2B are graphs showing maximum radius of a polymer bubble vs. attachment circle radius of the polymer bubble for a polymer bubble under the Earth's gravity and Low Earth Orbit microgravity, respectively, according to illustrative embodiments of the invention.

FIGS. 2A and 2B are graphs showing maximum radius of a polymer bubble vs. attachment circle radius of the polymer bubble for a polymer bubble under the Earth's gravity and Low Earth Orbit microgravity, respectively, according to illustrative embodiments of the invention. These graphs show that under gravity of $10^{-4}$ g, it is possible to form approximately 100 times larger scale bubbles than are possible under Earth's gravity. Therefore, a 50 cm bubble formed on Earth corresponds to approximately a 50 m diameter bubble if formed in microgravity.

Table 2 contains examples of candidate metals for coating the cured polymer bubbles and Table 3 contains examples of estimates of the power required for coating from metal filaments or wires. For coating under terrestrial gravity (e.g., the gravity found on Earth), metals that attain sufficiently high vapor pressure upon heating before reaching their melting point can be used. This is so that the filament does not simply melt, fall, and rupture the bubble. This limitation experienced under Earth laboratory conditions does not apply in space microgravity.

As shown on Tables 2 and 3, the metal can comprise at least one of cobalt, chromium, iridium, iron, molybdenum, rhenium, tungsten, osmium, nickel, zinc, copper, brass, nichrome, or aluminum. The metal can be disposed on the inner or outer surface of the polymer bubble. In some embodiments, the metal is disposed to cover the entire inner or outer surface of the bubble. In some embodiments, the metal is disposed on a substantial portion of the either the internal or external surface of the rigid polymer bubble.

TABLE 2

Candidate Metals with Vapor Pressure $\geq 1 \times 10^{-3}$ T below their Melting Point

| Metal | Melting Point (K) | Temperature at Vapor Pressure (K) | |
|---|---|---|---|
| | | $10^{-3}$ torr | $10^{-2}$ torr |
| 1) Cobalt | 1768 | 1342 | 1454 |
| 2) Chromium | 2163 | 1511 | 1637 |
| 3) Iridium | 2727 | 2379 | 2570 |
| 4) Iron | 1812 | 1566 | 1698 |
| 5) Molybdenum | 2890 | 2572 | 2797 |
| 6) Rhenium | 3453 | 3069 | 3333 |
| 7) Tungsten | 3650 | 3249 | 3650 |
| 8) Osmium | 3273 | 2719 | 2932 |

TABLE 3

Design of Metal filaments for Coating Bubbles

| Metallic Source | MP (K) | Temperature (K) @ Vapor Pressure | | Resistivity ($\mu$ohm cm) | Resistance (ohm)* | Power Reqd. for $10^{-3}$ torr Deposition (W) | Current Reqd. (Amps) |
|---|---|---|---|---|---|---|---|
| | | $10^{-4}$ (Torr) | $10^{-3}$ (Torr) | | | | |
| Cobalt | 1768 | 1247 | 1342 | 6.34 | 0.039 | 4.1 | 10.3 |
| Chromium | 2163 | 1403 | 1511 | 12.9 | 0.079 | 4.9 | 7.9 |
| Nickel | 1726 | 1207 | 1296 | 6.84 | 0.042 | 4.6 | 10.5 |
| Zinc | 692 | 523 | 566 | 5.92 | 0.036 | 0.7 | 4.4 |
| Copper | 1336 | 1298 | 1406 | 1.67 | 0.010 | 9.1 | 30.2 |
| Brass | 1190 | — | — | 6.4 | 0.039 | 6.8** | 13.2 |
| Nichrome | 1668 | 1217 | — | 105.0 | 0.64 | 4.6 | 2.7 |

Figures 3A, 3B, 3C:
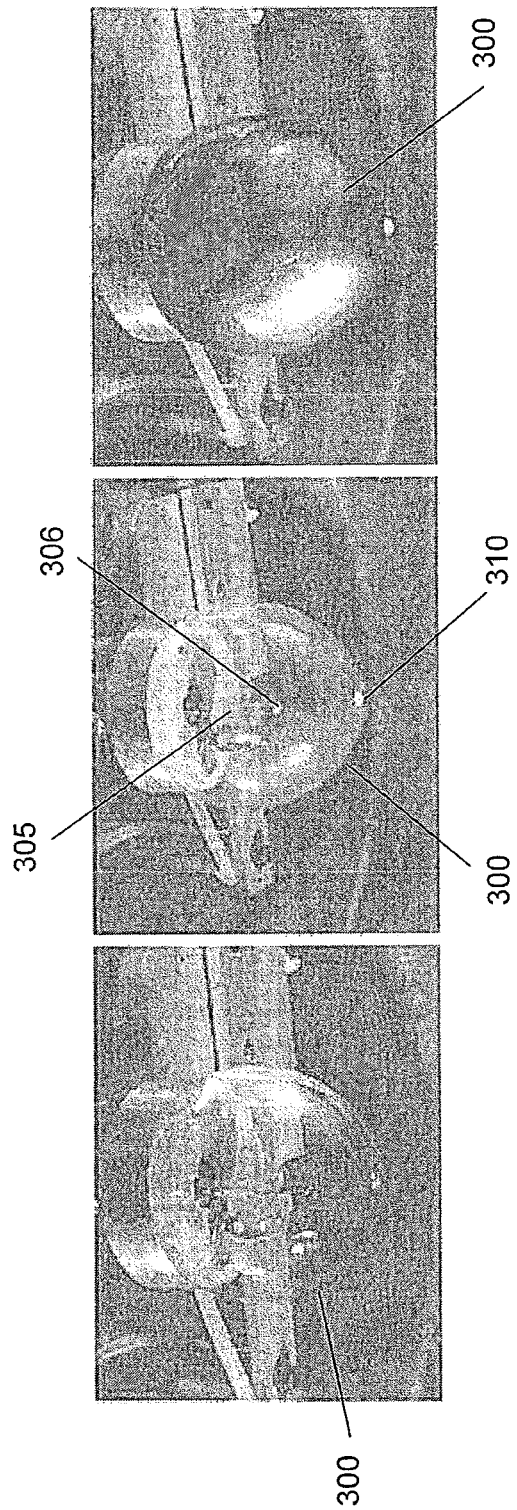
FIGS. 3A-3C illustrate a method of metalizing an internal surface of a polymer bubble, according to an illustrative embodiment of the invention.

*Length = 3 cm, Dia. = 0.25 mm
**Brass is heated to melting point for zinc deposition FIGS. 3A-3C illustrate an example of metalizing the internal surface of a polymer bubble, according to an illustrative embodiment of the invention. Specifically, FIG. 3A shows a non-metalized polymer bubble 300 that is approximately 10 cm in diameter. FIG. 3B shows the bubble 300 with a source 305 (e.g. a filament) lowered into the bubble 300. During operation, the filament 305 glows as shown by a bright portion 306 of the filament 305. A spot 310 on the bubble 300 is formed because even though the wall of the bubble can be very thin, the liquid polymer drains to the bottom of the bubble 300 due to gravity. When the spot 310 becomes white in appearance, the bubble has been fully cured. FIG. 3C shows the bubble 300 after the internal surface of the bubble has been metalized. To metalize the inner surface of the bubble, energy is run through the filament so that the metal flashes onto the inner surface of the bubble.

Figure 4:
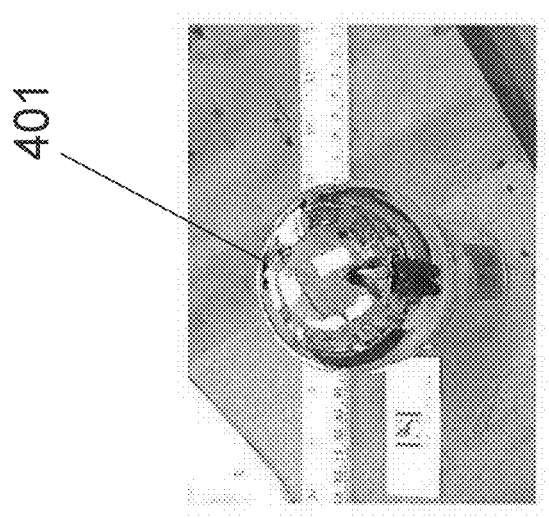
FIG. 4 shows a diagram of a polymer bubble after metalization on its external surface, according to an illustrative embodiment of the invention.

The metal can also be dispersed on the external or outer surface of the polymer bubble. FIG. 4 shows a diagram of a polymer bubble after metalization on its external surface, according to an illustrative embodiment of the invention. An externally metalized surface 401 of a thermally cured Conathane bubble (approximately 5 cm in diameter) with a eutectic mixture of gallium-tin alloy (melting point of approximately 28 C, 98.2% Ga, 1.8% Sn) is shown. To disperse a metal on the external surface of a cured polymer bubble, the bubble can be inserted (e.g. dipped) into a liquid metal, sprayed with a liquid metal (e.g., metals that are liquid at or around room temperature), or liquid metal can be evaporated on the external surface of the bubble with coating accomplished by rotating the bubble relative to the source of the evaporating liquid metal.

A metal coating thickness on the order of approximately 10 nm can be sufficient for achieving reflectivity (>95%) in the visible, infrared, and microwave regions. The mass of a metal coating can be a small fraction (approximately 10%) of the total bubble mass. For example, a mass of a 10 m diameter bubble that is approximately 0.5 micron thick is approximately 150 g. The mass of a 20 nm aluminum coating on this bubble can be approximately 15 g.

In some embodiments, a flat or curved surface can be formed by intersecting two bubbles. The flat or curved surface can be formed by forming two liquid polymer bubbles (e.g., forming each as described above in FIG. 1), intersecting the two liquid polymer bubbles, and isolating a surface of intersection between the two liquid polymer bubbles. In some embodiments, the two bubbles can be formed from a mixture of at least two of a liquid polymer, a UV curing metal, a stabilizer, a UV absorber, or a surfactant.

FIGS. 5A-5D illustrate a method of isolating a surface of intersection 505 of two liquid polymer bubbles 510, 515, according to an illustrative embodiment of the invention. More specifically, FIG. 5A and FIG. 5B show the two liquid polymer bubbles 510, 515 brought into contact such that they intersect at the surface of intersection 505. In some embodiments, the surface of intersection 505 can be isolated by passing the two liquid polymer bubbles 510, 515 through a pair of rings, e.g., a first ring 520 and a second ring 525. In some embodiments, the two liquid polymer bubbles 510, 515 are formed from a mixture of Conathan/FC/130 and Solithane/FC/130.

FIGS. 5C and 5D show the surface of intersection 505 once it is isolated from the remainder of the two liquid polymer bubbles, 510, 515. The surface of intersection 505 can be isolated by first curing and then excising (e.g., by impinging UV onto the two liquid polymer bubbles 510, 515) portions of each of the two liquid polymer bubbles 510, 515 that are not part of the surface of intersection 505. In some embodiments, excising includes passing an electrical current through the first ring 520 and the second ring 525 such that the electrical current melts the portions of each of the two liquid polymer bubbles, 510, 515 that are not part of the surface of intersection.

In some embodiments, the two liquid polymer bubbles 510, 515 are the same size. In these embodiments, the surface of intersection 505 can be flat. In some embodiments, the two liquid polymer bubbles 510, 515 are formed from identical injector nozzles connected to a common supply of gas, for example, dry nitrogen. In some embodiments, the two liquid polymer bubbles 510, 515 are different sizes. In these embodiments, the surface of intersection 505 can be spherical (see, e.g., FIG. 14).

FIGS. 6A-6D illustrate a method of isolating a surface of intersection 605 of two liquid polymer bubbles 610, 615, according to an illustrative embodiment of the invention. FIG. 6A shows two intersecting liquid polymer bubbles 610, 615. FIG. 6B shows the two liquid polymer bubbles 610, 615, each having a first portion that is excised. FIGS. 6C and 6D show the surface of intersection 605 after it has been isolated from liquid polymer bubbles 610, 615.

Figure 7A:
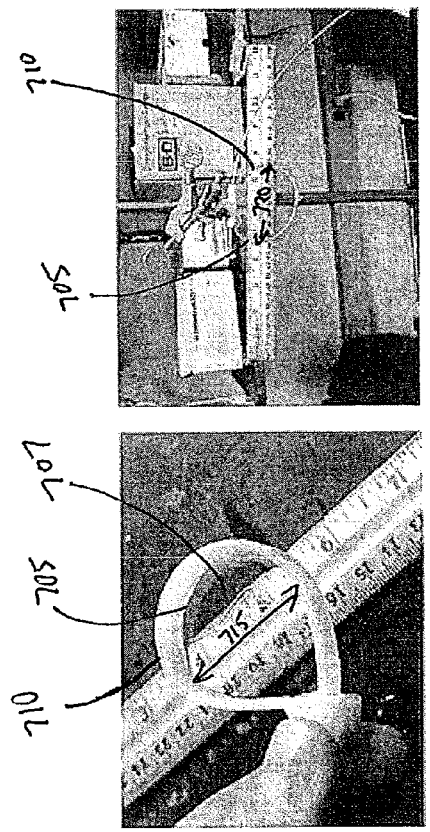
FIGS. 7A-7D show a diagram of a method of casting a liquid polymer mixture onto an aperture and expanding the aperture to form a large film, according to an illustrative embodiment of the invention.
Figure 7B:
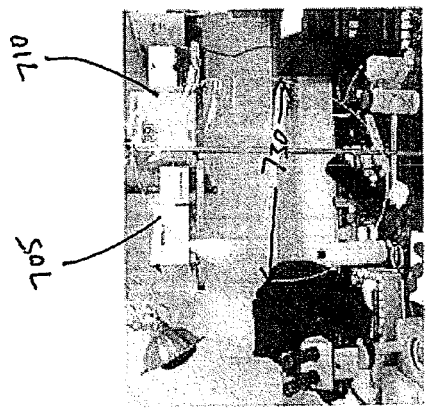
Figure 7C:
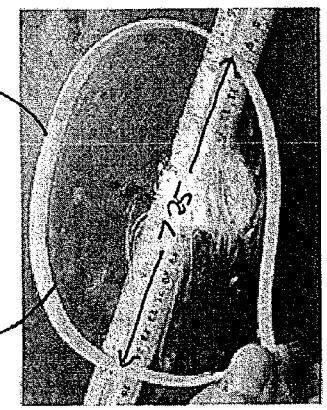
Figure 7D:
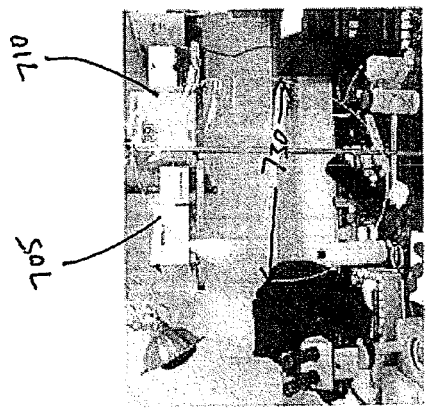

In some embodiments, a flat liquid polymer film can be formed by casting a liquid polymer mixture across an aperture (e.g., a hoop) in an object (e.g., plastic tubing) and expanding the aperture to reach a predetermined size for the film. FIGS. 7A-7D show a diagram of a method of casting a liquid polymer mixture onto an aperture 705 and expanding the aperture to form a large film 707, according to an illustrative embodiment of the invention. FIG. 7A shows the flat film 707 of a liquid polymer (e.g., a castor oil/FC430 mixture) formed using an aperture 705 (e.g., an expanding PEEK plastic tubing) that has a first aperture diameter 715 of approximately 5 centimeters. FIG. 7B shows expanding the aperture from the first aperture diameter 715 to a second aperture diameter 720 of approximately 9 centimeters, resulting in a corresponding increase in the size of flat film 707. FIG. 7C shows expanding the aperture from the second aperture diameter 720 to the third aperture diameter 725 of approximately 15 centimeters. FIG. 7D shows expanding the aperture diameter from the third aperture diameter 725 to the fourth aperture diameter 730 of approximately 45 centimeters, which resulted in a film size of approximately a 15 cm by 21 cm oval.

In some embodiments, after the flat film 707 reaches a desired or predetermined size, the flat film 707 is cured with radiation (e.g., solar radiation) to form a rigid polymer film. The rigid polymer film can be metalized with a metal on at least one surface of the rigid polymer film to form the metalized polymer film.

FIGS. 8A-8C show a diagram of a method of expanding a hoop 176 to form a large area film in space, according to an illustrative embodiment of the invention. In particular, FIG. 8A shows the hoop 176 is expandable at point 177, for example through a clasp 178. The hoop 176 can be expanded to increase the surface area 172 of the inside of the hoop 176. The hoop 176 can be placed on a flat surface 171 to ensure that the liquid polymer solution is evenly distributed on the hoop. The hoop can be made of space durable materials such as kapton tape or metallic (e.g., aluminum) tape.

FIG. 8B shows the liquid polymer solution cast onto the surface area 172 of the hoop 173. The hoop 173 can be adjusted to a diameter (e.g., approximately 2 cm), and placed on the flat surface 171. The flat surface 171 can be such that the bubble liquid can "wet" the flat surface 171. The flat surface 171 has a length 174 and a width 175. The length 174 and the width 175 of the surface 171 can be used to ensure that a sufficient liquid pool is provided. The liquid polymer mixture can be cast onto the surface area 172 of the hoop 173 by a nozzle 170 that disperses the liquid polymer mixture. The surface 171 can increase the likelihood that the liquid polymer mixture will be cast onto the hoop 173.

FIG. 8C is a diagram showing a continuously expanding hoop 179 for formation of large area films in space from liquid polymer solution, according to an illustrative embodiment of the invention. The hoop 179 can be expanded through the device 187 to increase the interior surface area 180 of the hoop 179.

Figures 9A, 9B:
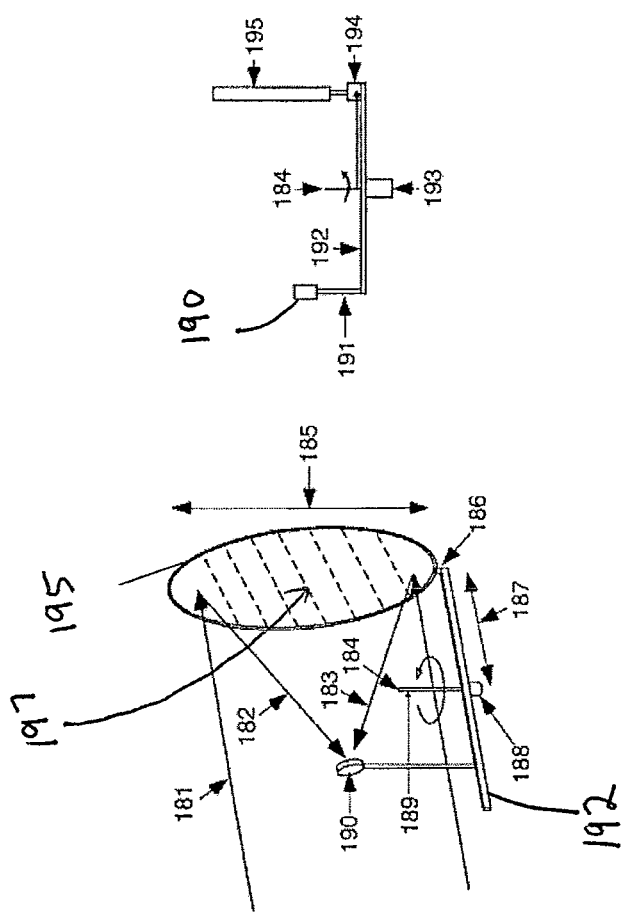
FIGS. 9A-9B show a diagram of a method of fabricating a parabolic reflector on board a spacecraft from a polymer film, according to an illustrative embodiment of the invention.

FIGS. 9A-9B show a diagram of a method of fabricating a parabolic reflector on board a spacecraft (not shown) from a polymer film 197, according to an illustrative embodiment of the invention. In some embodiments, the polymer film can be formed by the process of FIGS. 8A-8C. In some embodiments, the polymer film 197 can be foamed on a hoop 195 and transformed into a parabolic shape by spinning the polymer film 197 when the hoop 195 has reached a predetermined size.

The hoop 195 can be substantially circular or can be any other shape (e.g. square, oval, rectangular, or triangular). The predetermined size of the hoop 195 can be at least approximately 0.5 meters (e.g., 1 m., 2 m., 5 m., 15 m., 20 m., 25 m., 30 m., or any size suitable for a desired diameter of a flat film).

FIG. 9A shows a polymer film 197 applied in liquid form to a hoop 195, which can be connected to a lever 192 via a structural element 186. The hoop 195 can be expanded as indicated by arrow 185. Incoming solar flux 181 can be used to cure the polymer film 197. A metal source 190 can be used to apply metal to the polymer film 197 after the polymer film 197 has cured. A portion of the incoming solar flux 181 can be concentrated (as shown by arrows 182, 183) onto the metal source 190 to heat the metal source 190 after the metal source 190 is heated electrically and the polymer film 197 is first coated.

In some embodiments, the initially flat polymer film 197 can be placed at the end of a boom (not depicted) deployed from a spacecraft (not depicted) and stretched into a parabolic shape by spinning the spacecraft around an axis 189 (or axis 193 of FIG. 9B). The object can be spun at a rate to realize a predetermined focal length, for example, from approximately 0.5 to approximately 15 rotations per second. The spacecraft can be used as a fulcrum 188 for rotation. The polymer film 197 can then be cured in situ in incoming solar flux 181, followed by evaporating metal from a source 190 located on the boom.

FIG. 9B shows a side view of the configuration depicted in FIG. 9A. A metal source 190 can be attached to a lever 192 by a support 191. A hoop 195 can be attached to the lever 192 by a support 194. The lever 192 can rotate around axis 184 to impart a parabolic shape to the polymer film 197.

Figure 10:
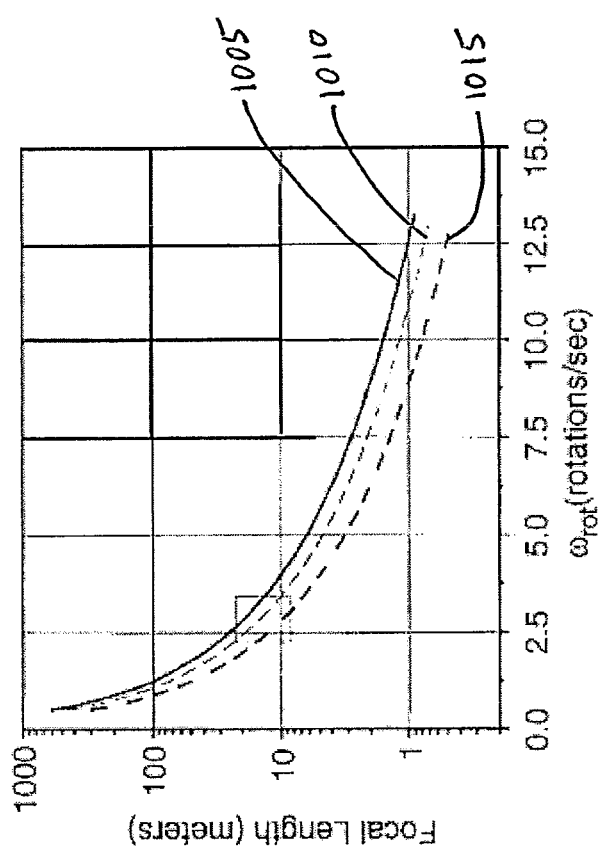
FIG. 10 is a graph showing focal length vs. spin rate of a spacecraft, according to an illustrative embodiment of the invention.

FIG. 10 is a graph showing focal length vs. spacecraft spin rate, according to an illustrative embodiment of the invention. The spacecraft spin rates are shown for forming a parabolic reflector for a reflector diameter of 20 m and various values of liquid surface tension. Line 1005 depicts exemplary focal lengths of a liquid polymer for a surface tension equal to approximately 40. For example, for a liquid polymer having a surface tension of approximately 40 dyne/cm, to form a reflector having a focal length of approximately 10 meters the spacecraft rotation rate can be approximately 3 to 4 rotations per second. Line 1010 depicts exemplary focal lengths of a liquid polymer for a surface tension equal to approximately 30 dyne/cm. For example, for a liquid polymer having a surface tension of approximately 30 dyne/cm, to form a reflector having a focal length of approximately 10 meters the spacecraft rotation rate can be approximately 2.5 to 4 revolutions per second. Line 1015 depicts exemplary focal lengths of a liquid polymer for a surface tension equal to approximately 20 dynes/cm. For example, for a liquid polymer having a surface tension of approximately 20 dyne/cm, to form a reflector having a focal length of approximately 10 meters the spacecraft rotation rate can be approximately 2 to 3.5 rotations per second. The focal length can be expressed as a follows:

$$f = \frac{4\pi^2 T}{\omega_{tot}^2 R_a \rho t}$$ EQN. 3 where f equals the focal length of the reflector, T equals the surface tension of the liquid polymer solution, $\omega_{rot}$ equals the spin rate in rotations per second, $R_a$ equals radius of the film hoop 195 in FIG. 9 and $\rho$ is the density of the liquid polymer solution.

Figure 11:
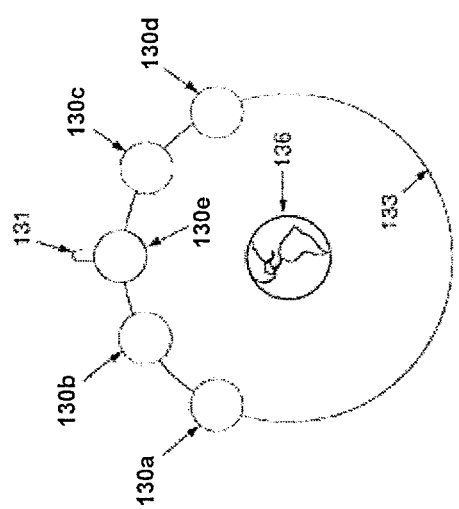
FIG. 11 shows a diagram of a method of using metalized space bubbles and/or films fabricated in a space microgravity environment as spacecraft decoys, according to an illustrative embodiment of the invention.

FIG. 11 shows a diagram of a method of using metalized space bubbles and/or films fabricated in a space microgravity environment as spacecraft decoys, according to an illustrative embodiment of the invention. The method can be used for enhancing survivability of space assets in Earth orbits. A first liquid polymer bubble 130a, a second liquid polymer bubble 130b, a third liquid polymer bubble 130c, a fourth liquid polymer bubble 130d, and a fifth liquid polymer bubble 130e, generally, liquid polymer bubbles 130 can be formed in space (e.g., by the methods and systems as described above). Each of the liquid polymer bubbles 130 and the spacecraft 131 can be rotating within orbit 133. Each of the liquid polymer bubbles 130 appear to a detector (not shown) on Earth 136 as similar objects. Thus, a detector attempting to track the spacecraft 131 from Earth 136 can be unclear as to which object is actually the spacecraft 131 and can thus be unable to track the spacecraft 131. Each of the liquid polymer bubbles can be used as a decoy. If a mission is to destroy the spacecraft 131, in order to ensure that the spacecraft 131 is destroyed, each of the liquid polymer bubbles 130 and the spacecraft 131, can be destroyed because it is not clear which object is the spacecraft 131. This can add extra time and cost to a destruction mission on part of an adversary. If enough decoys are deployed, the total cost and time involved with destroying each object can be prohibitive for the adversary.

A method of using a metalized polymeric bubble as a decoy in a space microgravity environment can include deploying more than one metalized polymeric bubble from a spacecraft such that the spacecraft and the metalized polymeric bubbles appear substantially similar to a spacecraft detector. For example, the metalized polymeric bubbles can be the same size and/or shape as the spacecraft. If the spacecraft is 1 m in diameter, then the metalized polymeric bubbles that are used as decoys are also approximately 1 m in diameter.

Figure 12:
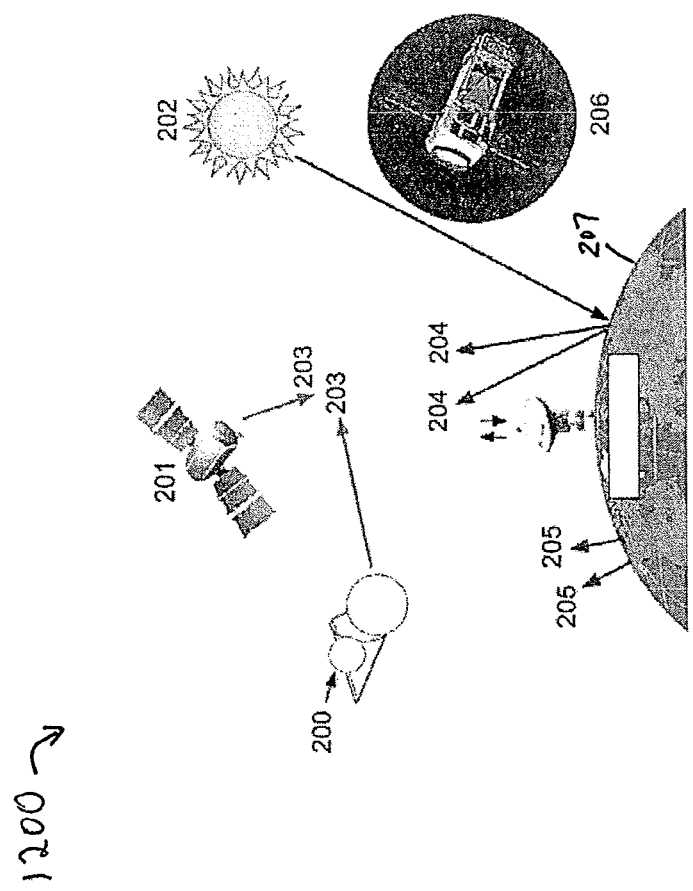
FIG. 12 shows a diagram of a system having variable size optical targets for ground/space-based sensor calibration sources, according to an illustrative embodiment of the invention.

FIG. 12 shows a diagram of a system 1200 having variable size optical targets for ground/space-based sensor calibration sources, according to an illustrative embodiment of the invention. The system 1200 includes a liquid polymer bubble 200, spacecraft 206, the sun 202, the Earth 207 and a spacecraft 201. The spacecraft 206 can include a sensor (not shown). The spacecraft 206 can calibrate its sensors by receiving solar reflections from the liquid polymer bubble 200. For example, the sun 202 can shine on the Earth 207, which can result in solar reflections 204, 205 from the Earth 207. The solar reflections 204, 205 can impinge upon the liquid polymer bubble 200, which can further reflect the solar reflections (e.g., solar reflection 203). The solar reflection 203 impinges upon the spacecraft 206.

Figures 13A, 13B:
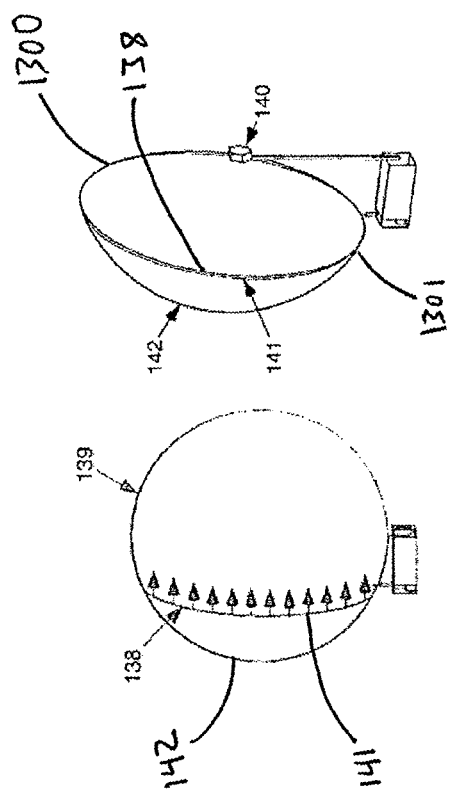
FIGS. 13A-13B shows a system for forming a metalized space bubble to be used as a large microwave reflector, according to an illustrative embodiment of the invention.

FIGS. 13A-13B show a system for forming a metalized space bubble used as a large microwave reflector 1300, according to an illustrative embodiment of the invention. The microwave reflector 1300 can be deployable from a satellite (e.g., Nanosatellites such as a 3-U CubeSat). To create the microwave reflector 1300, a dual ring system 1301 can be used to form the large microwave reflector 1300. The dual ring system 1301 includes an inner ring 141, a spherical film 142, and an outer ring 138. As shown in FIG. 13A, the inner ring 141 holds a first portion 142 of a liquid polymer bubble (e.g., as formed as described above in FIG. 1) and the outer ring 138 holds a second portion 139 of the liquid polymer bubble. As shown in FIG. 13B, when an electrical current (e.g., via a power source not shown) is applied to the outer ring 138, the current melts away and excises the second portion 139 of the liquid polymer bubble leaving only the first portion 142 of the liquid polymer bubble. A metal source 140 can be coupled to the dual ring system 1301 such that a metal deposited into the first portion 142 can reach the center of the first portion 142. Once the first portion 142 is metalized, the first portion 142 can be used as a microwave reflector. In some embodiments, the metal is vaporized onto the microwave reflector 1300.

FIGS. 14A-14G show a diagram of fabricating large area microwave reflectors/antennas in space, deployed from a nanospacecraft, according to an illustrative embodiment of the invention. More specifically, FIG. 14A shows a spacecraft (e.g., a CubeSata) 210. FIG. 14B shows a bubble injector nozzle subsystem 211 coupled to the spacecraft 210. The bubble injector nozzle subsystem 211 can incorporate a metalization source/filament). FIG. 14C shows a pair of closely spaced support rings 212 coupled to the spacecraft 210. The support rings 212 can be coupled to the spacecraft by a deployment mechanism (not shown). FIG. 14D shows a support ring pair 213 made of a shape memory alloy (e.g., nitinol) and expanded in place. FIG. 14E shows a liquid polymer spherical bubble 214 of a predetermined size formed at an injection port of the spacecraft 210 and inflated to pass through a support ring pair 213. FIG. 14F shows an unwanted portion of the bubble (not depicted) excised by passing a current to melt the polymer, leaving a wanted portion 215. The excised portion of the polymer bubble can be jettisoned away from the spacecraft by pressure of an inflation gas. FIG. 14G shows deploying a feed horn 216 to complete the antenna system.

Figure 15:
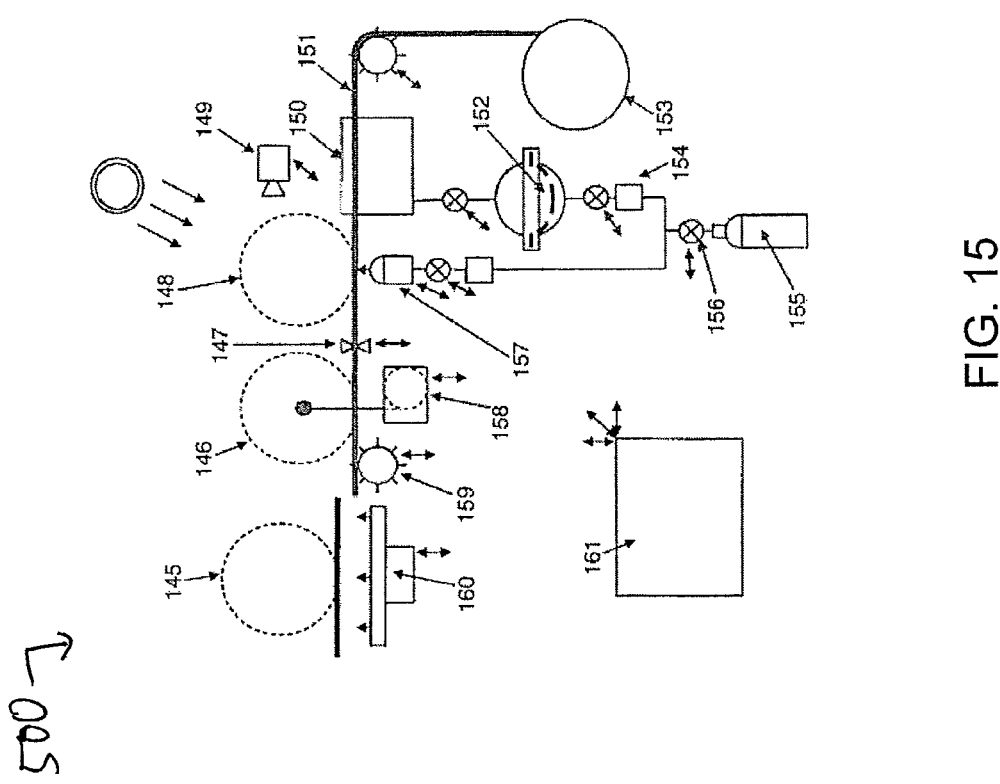
FIGS. 15-16 show a diagram of a system for forming, UV-curing, and metalizing of polymeric bubbles in space, according to an illustrative embodiment of the invention.
Figure 16:
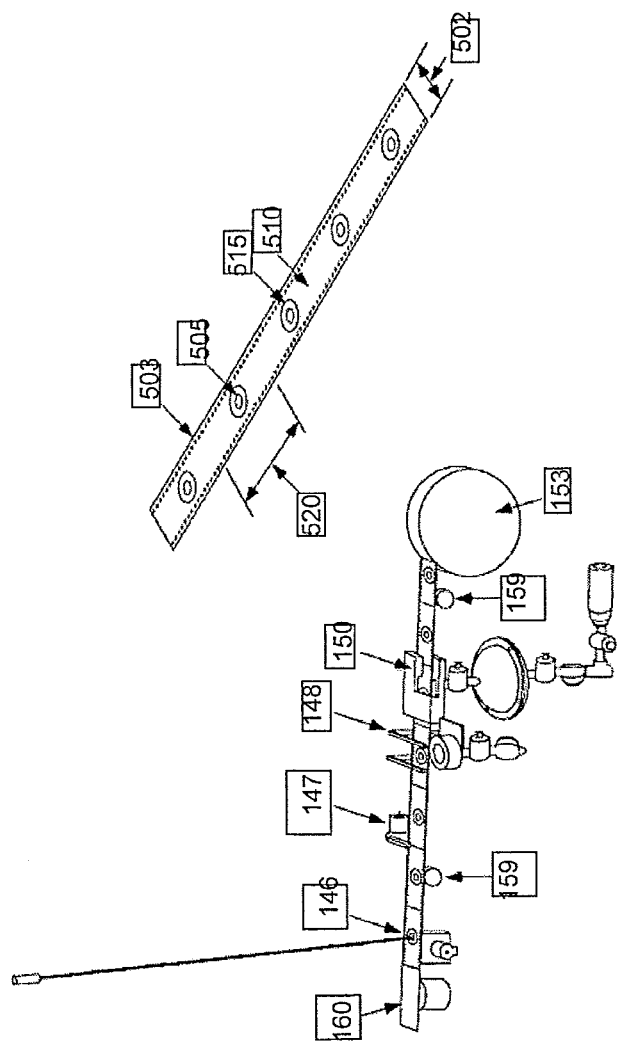

FIGS. 15-16 show a diagram of a system 500 for forming, UV-curing, and metalizing polymeric bubbles in space, according to an illustrative embodiment of the invention. Liquid polymer bubbles can be formed during orbital night and cured in the sun as a spacecraft coupled to the liquid polymer bubbles crosses the terminator of the Earth. Once the liquid polymer bubble is cured, unwanted portions of the liquid polymer bubble can be excised. The portion of the liquid polymer bubble that is excised can depend on the application for the liquid polymer bubble.

FIG. 15 shows a system 500 for fabrication of metalized, spherical targets fabricated from UV-cured polymer bubbles in space, according to an illustrative embodiment of the invention. The target size can be selectable from less than half a meter diameter to a few meters in diameter to hundreds of meters in diameter. The system can be designed such that the UV-cured metalized polymer bubbles are less than 10 kg in mass, less than 0.1 cubic meters in volume, and require less than 40 watts of power to fabricate. The system can be designed to produce bubbles in an automated fashion using 35 mm tape as the carrier for fabrication. The bubbles can be deployed in order, attached to the small tape carrier. The system 500 includes a small canister 153 containing a roll of 35 mm tape 151 (e.g., standard polyimide integrated circuit assembly tape customized as discussed herein), drive sprockets on stepper motors 159, a reservoir 150 that generates a film of controlled mass of the polymer liquid to the tape 151, a bubble inflation and curing station 148, a bubble detection sensor 149, a bubble metalization, 146 (including metalization apparatus 158) and excise station 147, a target deployment mechanism 160 for deploying a target 145 into space, a liquid polymer supply subsystem 152, a gas pressurization subsystem, which includes a cylinder 155 containing pressurization gas, an on-off solenoid valve 156, a pressure regulator 154, an inflation apparatus 157, and control electronics 161. The system 500 can be designed to operate from 28 VDC power supplied by a spacecraft.

FIG. 16 shows another view of the system of FIG. 15, including the canister 153 of tape, drive sprockets on stepper motors 159, a reservoir 150 that generates a film of controlled mass of the polymer liquid, a bubble inflation and curing station 148, a bubble metalization 146 and excise station 147, and a target deployment mechanism 160. The system as shown in FIG. 16 can require 6750 cc (0.007 cubic meters or approximately 20 cm cubed) of volume and have less than 2 kilograms of mass. The size of the system can be reduced through further optimization. The total power of all elements is approximately 25 Watts, but since not all of the components are operated at the same time, the maximum power draw of the system can be less than 15 Watts at any given time.

FIG. 16 also shows a ribbon carrier tape for fabricating the polymer bubble targets. The tape can be a standard 35 mm polyimide tape 502 widely used to package and test Integrated Circuits (ICs) in the semiconductor industry, particularly in the format for Tape-Automated-Bonding (TAB). The tape is fabricated by DuPont and punched with standard sprocket holes 503 and any other desired holes by numerous custom TAB fabricators. The tape can include a 1 cm diameter hole 505 (through which the bubble is to be inflated and subsequently metalized).

During bubble formation the bubble's base size can be limited and prevented from "walking" into an undesirable area. In some embodiments, a defined "edge" is providing which limits the bubble base. The bubble stops its "walking" behavior when its base migrates toward and reaches the edge, with the sharp edge essentially providing a discontinuity in the surface wetted by the bubble fluid. In some embodiments, a non-wettable, low surface energy coating is applied to limit bubble migration. This approach can eliminate many of the complexities and bubble stability issues associated with the edge defining method. Use of a non-wettable surface 510 can involve the coating of all but a two cm diameter area 515 centered on the hole in the tape with any of a number of non-wettable coatings (e.g., Teflon, Parylene-C, etc.). The center "wettable" area can be enhanced with various surface treatments to raise its surface energy and contain numerous surface cavities as well as radial serrations so that it acts like a sponge, capturing a larger and more precisely controlled volume of the polymer liquid. This can enable larger size bubbles and more precise control during their formation. The length of the individual tape segments 520 is yet to be determined, but ~76 mm (3 in.) long segments can be used.

Referring to FIG. 15, the tape canister 153 can be a simple cylindrical container to hold the roll of carrier tape. In some embodiments, a ten cm diameter canister can hold a roll with approximately two hundred tape segments. This can allow fabrication of two hundred targets over an extended mission life.

Stepper Motors 159 which advance 35 mm film a precise amount can be used in many 35 mm cameras, and are of the small size desired in this application. The motors can also be used in space systems and are considered reliable in the space environment. The sprockets for TAB Standards can be slightly different than those used in cameras (slightly different sprocket hole spacing), but those sprockets are widely used in TAB assembly equipment, and thus easily available.

The polymer liquid can be applied to the desired area of the tape by several methods. For example, a film can be created across the open hole in the tape in order to inflate a bubble; second, a precisely controlled mass of polymer liquid can be applied to the tape wettable area (and only to the wettable area). A "striker" method can be used to create the desired liquid film and apply a mass of liquid for bubble inflation.

In some embodiments, the ribbon tape can be passed through the bulk of the polymer liquid to impart the liquid to the tape. In some embodiments, the seal area is of a wider dimension than the hole in the tape to prevent leakage upon tape entry into or exit from the liquid reservoir. In some embodiments, the polymer liquid is introduced into the reservoir once the in-orbit fabrication of targets begins. In some embodiments, in the launch configuration no liquid is in the reservoir and a leader segment of tape is in position through the reservoir. In some embodiments, the leader segment has a large slot, which can allow air entrapped in the reservoir on earth to escape once the equipment is in orbit. In some embodiments, the leader is moved out of the reservoir to bring in a normal tape segment, thus initiating full seals at both the entrance and exit of the tape, prior to opening the valve to fill the evacuated reservoir with the polymer liquid.

The liquid supply subsystem includes a pressure regulator and control valves, and a bladder tank which uses a low gas pressure to slowly introduce polymer liquid into the reservoir as it is used up supplying controlled amounts of polymer liquid onto the carrier tape. Because the flow rates are extremely low, the pressure on the bladder can also be extremely low. The bladder tank can therefore be designed to be extremely lightweight, and can be fabricated at low cost. The tank volume can be approximately 300 cc to fabricate 200 targets. A tank internal diameter of approximately 8.4 cm can provide the needed amount of polymer liquid. The gas pressure can be supplied by a small cylinder (probably $SF_6$), which can also be the supply for inflation of the bubbles.

The gas pressurization system can consist of a standard miniature cylinder with an on/off control valve. The cylinder can supply pressurized gas to both the bubble inflation system and to the bladder tank which forces liquid polymer into the liquid polymer reservoir. $SF_6$ can be used as the pressurant gas.

In some embodiments, the bubble inflation hardware includes a nozzle to provide inflation. In some embodiments, the nozzle is in a retracted position until the tape segment is moved into position at the bubble inflation station. In some embodiments, once the tape segment is moved into position, a clamping device is moved into position to hold the flexible tape firmly in position during inflation and curing; and the inflation nozzle is moved into position to contact the o-ring seal against the tape so that inflation can proceed. In some embodiments, the clamping mechanism is withdrawn after bubble curing to allow the tape and bubble to proceed to the next station. In some embodiments, a flexible hose can be between the inflation head and on/off valve to accommodate the rack-and-pinion motion of the inflation head.

In some embodiments, a bubble sensor can ensure that a bubble is present before metalization begins. The metalization can be accomplished by vapor deposition on the inside of the bubble. In the event that a bubble is not properly formed (e.g., burst film, too small a size due to inadequate inflation, etc.), the sensor can instruct a controller to cancel metalization and excision steps and discard the tape segment with the failed bubble. This precaution can also avoid the possibility of contaminating spacecraft while attempting to coat a failed bubble.

The metalization of the inside of the UV-cured bubble can be accomplished by inserting metal (or alloy) source (such as a filament) into the center of the bubble. The metal can be heated to deposit its vapor on an inner surface of the bubble after it is cured in sunlight and after it is moved via the carrier tape to the metalization station. In some embodiments, inflation pressure during vaporization is <<1 millitorr. A tape measure type device can be integrated with a stepper motor and the measuring-tape can be moved into position at the center of the sphere. The stepper motor can allow centering spheres from a few centimeters up to a few meters.

A knife-wheel device (used on large paper plotters, for example) can be used to excise the tape segment from the tape roll. It can be mounted on a device similar to the clamping bar mechanism previously described above.

Once the metalized target fabrication is completed, the target can be separated from the spacecraft for certain missions. The separation can be achieved without impacting other parts of the spacecraft. For example, to push off a target a low force (e.g., a 1 m diameter bubble weighs <2 g) can be applied. The low force can be provided by puffs of compressed gas, a solenoid push-off mechanism, etc.

The control electronics 161 can include a small (10 cm×10 cm) circuit board with a microcontroller which sends signals to two synchronized stepper motors which drive the carrier tape, gas cylinder on/off supply valve, bladder pressurization on/off valve, liquid Polymer supply on/off valve, clamp and inflation head motion stepper motor in/out, inflation head on/off valve, bubble detection sensor camera on/off switch, metalization source motion in/out, metalization source heater on/off, exciser stepper motor motion in/out, target deployment motion in/out. These signals are symbolized by the arrows in FIG. 15 that are being sent and received from the control electronics 161. In addition, the microcontroller can receive signals from the bubble detection camera, and other system health monitoring sensors. The microcontroller can run software programs which control the target fabrication process.

Table 4 shows size, mass and power requirements for each element of the system hardware, according to illustrative embodiments of the invention. The "Energy" is amount of Watt-seconds consumed in the fabrication of one target (one target per orbit). The gas and liquid polymer charges shown in Table 4 are for 200 targets fabricated during the mission.

As was shown in FIG. 16, the system can include a total 6750 cc (0.007 cubic meters) of volume. The hardware can have <2 kilograms of mass as shown in Table 4. The total power of all elements can be approximately 25 Watts, but since typically only a few of the elements are on at a given time, the maximum power draw can be less than 15 watts at any given time. The total energy required can approximately 6201 watt-seconds which can be dominated by the power used in the 650 second metalization step (5200 watt-sec) and the control electronics (775 watt-sec) which can be on for all of the fabrication process. Therefore, the bubble target system design can be highly compact (0.007 cubic meter), lightweight (<2 kg), and low power (~15 W) and fits well within budgets for mass of 10 kg, volume of 0.1 cubic meter, and power maximum of 40 W.

TABLE 1

Estimated System Volume, Mass, Power, and Energy Characteristics

| Element | Size (cc) | Mass (gm) | Power (Watt) | Duration Power (sec) | Energy (Watt-sec) |
|---|---|---|---|---|---|
| Carrier Tape | 2 | 2 | 0 | 0 | 0 |
| Tape Canister | 280 | 72 | 0 | 0 | 0 |
| Stepper Motor/Sprocket #1 | 18 | 90 | 2 | 30 | 60 |
| Stepper Motor/Sprocket #2 | 18 | 90 | 2 | 30 | 60 |
| Polymer Liquid Reservoir | 72 | 97 | 0 | 0 | 0 |
| Bubble Detection Camera | 10 | 46 | 0.6 | 5 | 3 |
| Liquid Polymer Charge | 300 | 300 | 0 | 0 | 0 |
| On/Off Valve #1 | 20 | 40 | 1 | 5 | 5 |
| On/Off Valve #2 | 20 | 40 | 1 | 5 | 5 |
| On/Off Valve #3 | 20 | 40 | 1 | 30 | 30 |
| On/Off Valve #4 | 20 | 40 | 1 | 35 | 35 |

TABLE 1-continued

Estimated System Volume, Mass, Power, and Energy Characteristics

| Element | Size (cc) | Mass (gm) | Power (Watt) | Duration Power (sec) | Energy (Watt-sec) |
|---|---|---|---|---|---|
| Pressure Regulator #1 | 25 | 50 | 0 | 0 | 0 |
| Pressure Regulator #2 | 25 | 50 | 0 | 0 | 0 |
| Plumbing Tubing | 8 | 14 | 0 | 0 | 0 |
| Clamp Stepper Motor Rack-Pinions | 20 | 98 | 2 | 4 | 8 |
| Inflation Head | 7 | 18 | 0 | 0 | 0 |
| Metalization Tape/ Stepper Motor | 21 | 100 | 2 | 5 | 10 |
| Metalization Source | 7 | 18 | 8 | 650 | 5200 |
| Gas Cylinder | 40 | 10 | 0 | 0 | 0 |
| Gas Charge | 36 | 1 | 0 | 0 | 0 |
| Control Electronics | 100 | 50 | 1 | 775 | 775 |
| Target Deployment Solenoid | 27 | 70 | 2 | 5 | 10 |
| Structure and Brackets | 185 | 500 | 0 | 0 | 0 |
| Totals | 1281 | 1836 | na* | na* | 6201 |

*not applicable: all elements are not on at the same times

A mechanical system can be configured as shown in FIGS. 14, 15 and 16, although those skilled in the art understand that other mechanical systems can be used to form liquid polymer bubbles in space.

Figure 17:
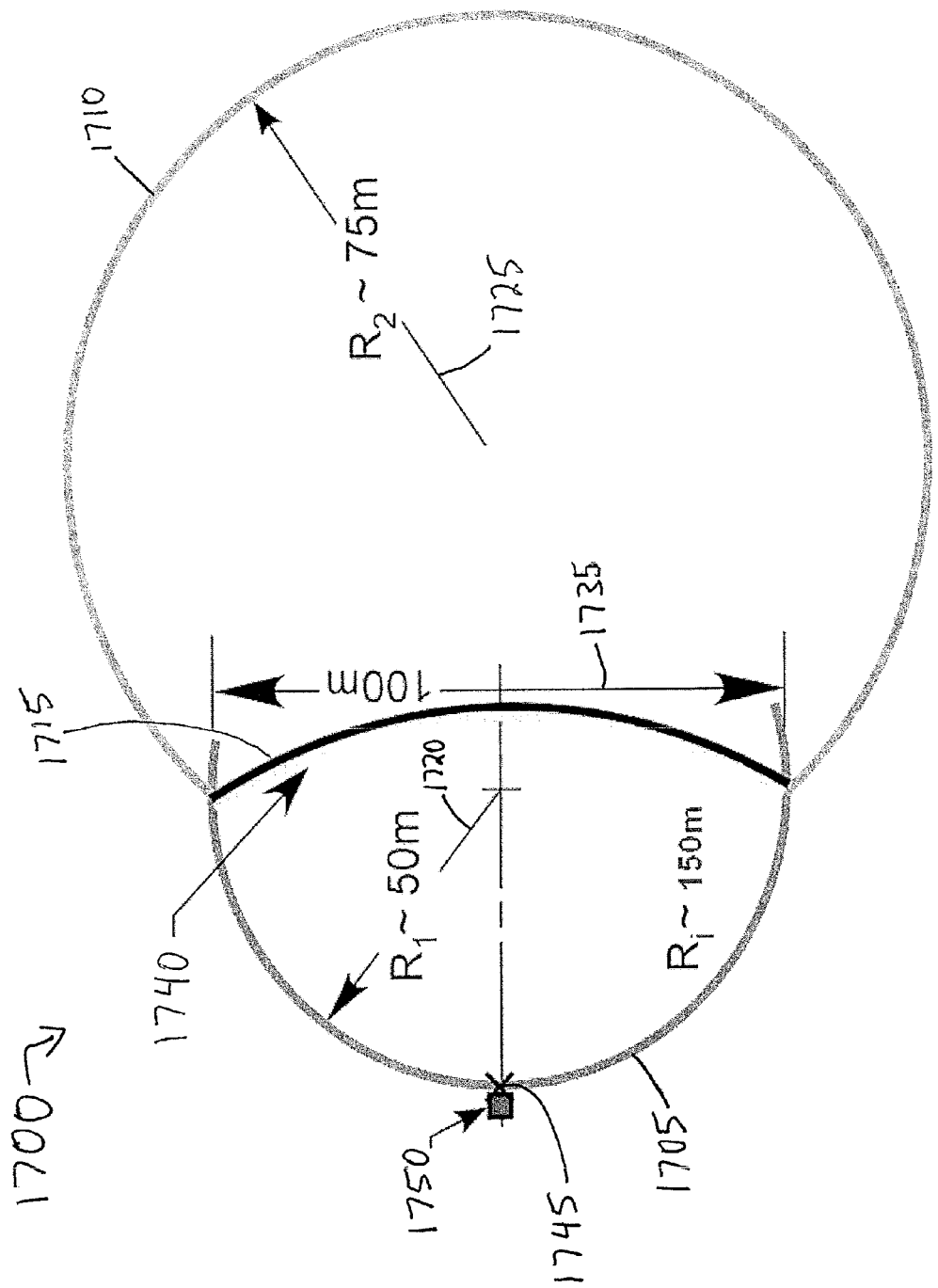
FIG. 17 shows a diagram of two intersecting bubbles, according to an illustrative embodiment of the invention.

FIG. 17 shows a diagram of two intersecting bubbles 1700 comprising an inner bubble 1705, an outer bubble 1710, and a surface of intersection 1715, according to an illustrative embodiment of the invention. The two intersecting bubbles 1700 include an inner bubble 1705 and an outer bubble 1710. The inner bubble 1705 and the outer bubble 1710 can be formed by a bubble making apparatus (e.g., bubble making apparatus as described below in FIG. 18A- FIG. 18B) that is coupled to the spacecraft 1750.

The inner bubble 1705 is in fluid communication with the outer bubble 1710 along a surface of intersection 1715. The surface of intersection 1715 can be spherical. The inner bubble 1705 has a first radius 1720 ($R_1$), and the outer bubble 1710 has a second radius 1725 ($R_2$). The surface of intersection 1715 has a radius of curvature 1730 ($R_i$). The radius of curvature 1730 can be defined as follows:

$$1/R_i = 1/R_1 - 1/R_2. \quad \text{(EQN. 4)}$$

Where $R_i$ is the radius of curvature 1730, $R_1$ is the first radius 1720 of the inner bubble 1705, and $R_2$ is the second radius 1725 of the outer bubble 1710. In some embodiments, the first radius 1720 ($R_1$) is approximately 50 meters. In some embodiments, the second radius 1725 ($R_2$) is approximately 75 meters. For a first radius 1720 ($R_1$) equal to 50 meters and a second radius 1725 ($R_2$) equal to 75 meters, according to EQN. 4, the radius of curvature 1730 ($R_i$) equals 150 meters. The surface of intersection 1715 has a diameter 1735. In some embodiments, the diameter 1735 is approximately 100 meters.

In some embodiments, the surface of intersection 1715 has a metalized inner (concave) face 1740 and a focus 1745. In some embodiments, the inner bubble 1705 and the outer bubble 1710 are formed such that the spacecraft is positioned at the focus 1745 of the surface of intersection 1715. In some embodiments, the inner bubble 1705 remains attached to the spacecraft 1750 while the outer bubble 1710 remains attached to the inner bubble 1705.

FIGS. 18A-18K, when viewed together, show diagrams of a method 1800 of fabricating a RF reflector in space using two polymer bubbles, according to an illustrative embodiment of the invention. The FIGS. 18A-18K include a bubble making apparatus 1803, an inflation assembly 1806, an injector plate 1812, bubble fluid 1815, an injector port 1818, an attachment lip 1821, a spacecraft 1824, a starting film 1827, a first gas 1830, a first bubble 1833, a first diameter 1836, a second film 1839, a second pressure 1842, a second bubble 1845, a second diameter 1848, a flow of gas 1851, two intersecting bubbles 1854, a surface of intersection 1857, an annular gas jet 1860, a short axis 1863, a centrifugal force 1866, an RF reflector 1869, metal atoms 1872, a source 1875, and an inner face 1878 of the surface of intersection 1857.

More specifically, FIG. 18A shows an exemplary first stage of the method 1800. The bubble making apparatus 1803 (see FIGS. 181-18K below) includes the inflation assembly 1806, a fluid reservoir (not shown), and flow control hardware (not shown). The inflation assembly 1806 includes an injector port 1818 that allows a gas to flow within the injector port 1818 into an inner cavity of the inflation assembly 1806. The injector plate 1812 contains bubble fluid 1815, and includes an attachment lip 1821 and a mechanism (e.g., a wiper blade not depicted) for moving the bubble solution. The bubble solution is spread onto the injector plate 1812 and across the inflation assembly 1806 to create a starting film 1827 within the inflation assembly 1806.

In some embodiments, the mechanism for releasing the bubble solution onto the injector plate 1812 is a wiper blade. In these embodiments, the wiper blade rotates to strike the starting film 1827 across the injector plate 1812. In some embodiments, the injector port 1818 is 10 centimeters in diameter. In some embodiments, 150 grams of the bubble fluid 1815 is inserted into the inflation assembly 1806.

FIG. 18B shows a first gas having 1830 having a first pressure ($P_1$) applied through the injector port 1818 to the starting film 1827. The starting film 1827 forms into a first bubble 1833. FIG. 18C shows the first bubble 1833 further inflating with the first gas 1830 continuing to be applied to the first bubble 1833 through the injection port 181. In some embodiments, the first pressure is approximately $10^{-5}$ Torr. In some embodiments, the gaseous pressure applied to the first bubble 1833 varies over time FIG. 18D shows the first bubble 1833 after it has been fully inflated. The first bubble 1833 possesses a first internal pressure and a first diameter 1836. The first diameter 1836 can be approximately 150 meters. For a bubble having a diameter of approximately 150 meters and a thickness of approximately 0.5 microns, the mass is approximately 35 kilograms. In some embodiments, the mass of the gas inside the bubble is approximately 50-100 milligrams.

Figures 18E, 18F:
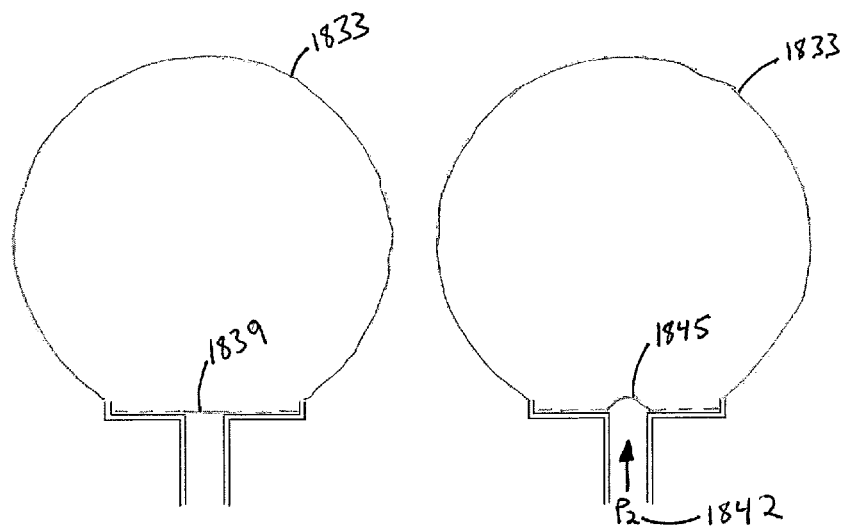

FIG. 18E shows a second film 1839 applied across the injector plate 1812 and injector port 1818 using bubble fluid 1815 (e.g., via the mechanism for spreading bubble solution onto the injector plate as discussed above in FIG. 18A). FIG. 18F shows a second pressure 1842 ($P_2$) applied through injector port 1818 to the second film 1839 to form a second (inner) bubble 1845. In various embodiments, the second pressure 1842 is greater than, less than, or equal to the first pressure 1830.

Figures 18G, 18H:
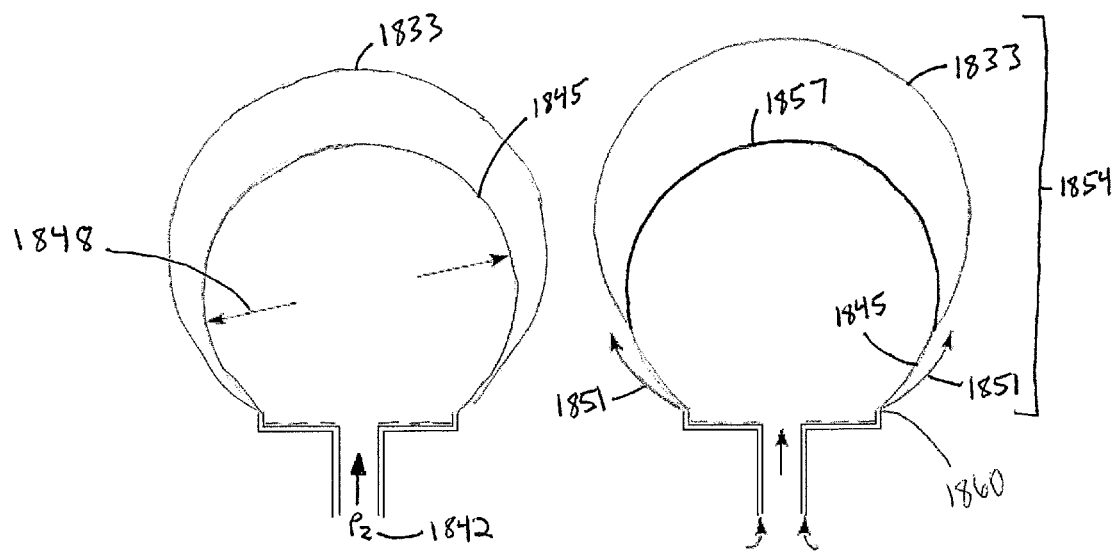

FIG. 18G shows the second bubble 1845 in its fully inflated state, at which point it possesses a second internal pressure and a second diameter 1848. The second diameter 1848 can be approximately 100 meters. For a bubble having a diameter of approximately 100 meters and a thickness of approximately 0.5 microns, the mass will be approximately 15 kilograms. The mass of the gas inside the bubble can be only approximately 50-75 milligrams.

FIG. 18H shows a flow of gas 1851 applied to an exterior surface of the first bubble 1833 to move the first bubble 1833 onto the second bubble 1845, causing the first bubble 1833 and the second bubble 1845 to form a surface of intersection 1857 having a first radius of curvature (not depicted). The flow of gas 1851 can be provided through an annular gas jet 1860. The annular gas jet 1860 can be coupled to the attachment lip 1821. The annular gas jet 1860 can be approximately 10-50 centimeters in diameter. In some embodiments, a velocity of the flow of gas 1851 along a circumference of the attachment lip 1821 is uniform.

In some embodiments, the first bubble 1833 separates substantially completely from the injector plate 1812 while remaining attached to the second bubble 1845. In some embodiments, the first radius of curvature is approximately 150 m.

FIG. 18I shows the spacecraft 1824 rotating on a short axis 1863 of the spacecraft 1824. The rotation can provide a centrifugal force 1866 that can move the first bubble 1833 in the direction of the centrifugal force 1866 (e.g., body force) onto a desired location on the second bubble 1845. As the first bubble 1833 is moved to the desired location on the second bubble 1845, the surface of intersection 1857 moves from having the first radius of curvature to having a second radius of curvature (not depicted). In some embodiments, the surface of intersection 1857 is approximately 100 meters in diameter. In some embodiments, the second radius of curvature is approximately 250 meters. In some embodiments, the rotation rate of the spacecraft 1824 approximately its short axis 1863 is approximately five rotations per minute or less.

In some embodiments, the stages of method 1800 depicted in FIGS. 18A-18I are performed in darkness. In some embodiments, the stages of method 1800 depicted in FIGS. 18A-18I take several minutes to complete.

FIG. 18J shows the spacecraft 1824 rotating in the sun (not shown) to cure or rigidize the bubbles. The stage of method 1800 shown in FIG. 18J can be performed as the spacecraft 1824 crosses the solar terminator (not depicted) into sunlight FIG. 18K shows the metalization process described above as applied to an inner face 1878 of the surface of intersection 1857 to form into the RF reflector 1869. Metal atoms 1872 can be evaporated from the source 1875 to metalize the inner face 1878.

In some embodiments, the inflation assembly 1806 is substantially disposed within the spacecraft 1824 along with the rest of the bubble making and metalization hardware (not shown), with no external appendages or deployment mechanisms needed. In some embodiments, injector plate 1812 and the attachment lip 1821 are located on an external face of the spacecraft 1824. The spacecraft 1824 can have a rectangular prism shape and can have a volume of approximately 1 to 2 cubic meters. The injector plate 1812 can be circular and/or comprised of metal. The attachment lip 1821 can be approximately 10-50 centimeters in diameter. The attachment lip 1821 can contain a sharp edge to ensure optimal bubble formation and retention.

In some embodiments, the inner face 1878 is concave. In some embodiments, the metalization process begins after the spacecraft 1824 stops rotating. In some embodiments, the spacecraft 1824 is slowly despun to avoid undue dynamical forces.

In some embodiments, the source 1875 is a metal reservoir. In some embodiments, the metal reservoir is resistively heated to vaporize the metal. Table 4 contains examples of some metals that can be used for metalization. As Table 4 shows, Aluminum, Chromium, Copper, Gold, Nickel and Platinum can be used.

TABLE 4

Vapor Pressure Data of Metals Suitable for RF Reflector Coating

| Metal | Melting Point (K) | Temperature (K) @ Vapor Pressure | |
|---|---|---|---|
| | | $10^{-4}$ (Torr) | $10^{-3}$ (Torr) |
| Aluminum | 933 | 1262 | 1370 |
| Chromium | 2163 | 1403 | 1511 |
| Copper | 1336 | 1298 | 1406 |
| Gold | 1337 | 1401 | 1521 |
| Nickel | 1726 | 1207 | 1296 |
| Platinum | 2041 | 2006 | 2167 |

In some embodiments, baffles are coupled to the source 1875. In some embodiments, the metal atoms 1872 are directed to impinge predominantly on the inner face 1878 of the surface of intersection 1857. In some embodiments, a desired metallic mass is deposited on the inner face 1878. For example, for an inner surface 1878 of a surface of intersection having a 100 meter diameter with a 20 nanometer aluminum coating, the aluminum mass is approximately 1 kilogram. For the same inner surface, a 10 nanometer gold coating adds approximately 3.2 kilograms.

The inflation pressure (P) within a bubble can be expressed as $$P = 4\gamma/R, \quad \text{(EQN. 5)}$$

where γ is the surface tension of bubble liquid and R is a radius of the bubble. In some embodiments, for bubble radii of 50 meters and/or 75 meters, the inflation pressure can be on /between $10^{-6}$ to $10^{-5}$ Torr. In some embodiments, a mean free path in the gas can range from tens to hundreds of meters.

In some embodiments, 60 kilograms of bubble fluid is used in the fluid reservoir. In some embodiments, for a polymer bubble solution with a density of approximately 1.05 g/cm$^3$, a liquid volume is approximately 0.6 m$^3$. In some embodiments, an areal density for the system will be approximately 0.02 kg/m$^2$.

FIGS. 19A-19C show diagrams of two intersecting polymer bubbles, according to an illustrative embodiment of the invention. FIG. 19A shows an outer bubble 1904 in physical contact with an inner bubble 1908 along a surface of intersection 1912. The surface of intersection 1912 can be spherical.

FIG. 19B shows the inner bubble 1908 moved under the force of gravity away from the outer bubble 1904 while remaining attached to the outer bubble 1904 along the surface of intersection 1912. FIG. 19C shows an expanded view of the surface of intersection 1912.

Figure 20A:
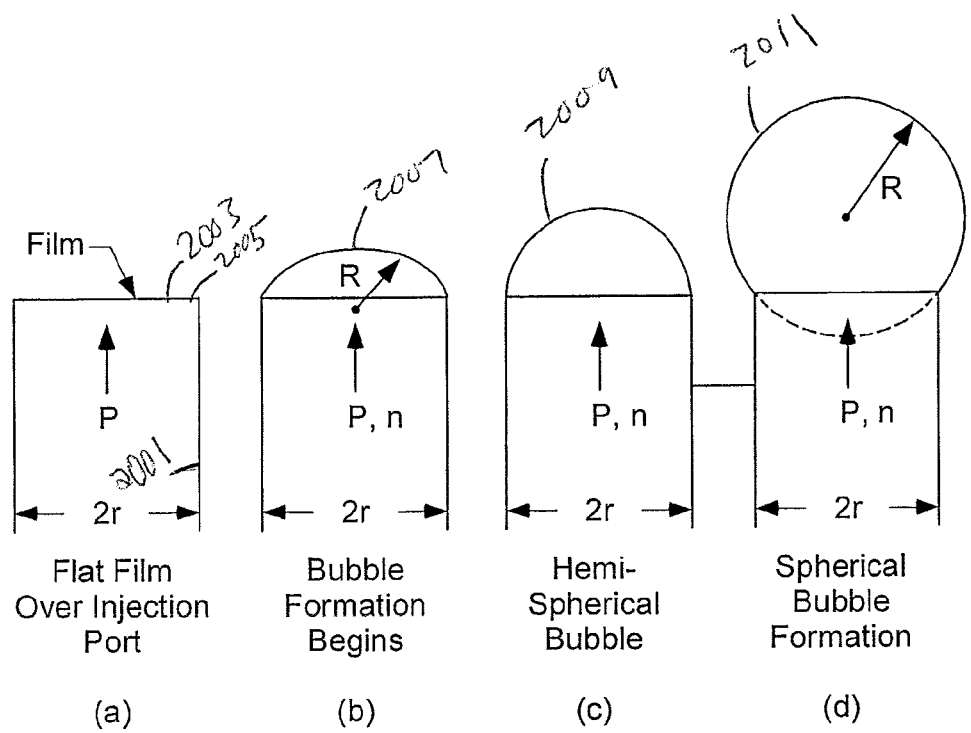
FIG. 20A shows diagrams of a polymer bubble inflating via an injector port, according to an illustrative embodiment of the invention.

FIG. 20A shows diagrams of a polymer bubble 2011 inflating via an injector port 2001, according to an illustrative embodiment of the invention. In stage (a) a flat film 2003 covers an aperture 2005 of the injector port 2001 while a gaseous pressure P is applied. In stage (b) bubble formation begins as the film expands and acquires a curved shape 2007 while a quantity of gas moles, n (which increases as the enclosed volume increases), is provided. In stage (c) the film acquires a hemispherical shape 2009. In stage (d) the film acquires a spherical shape and forms the polymer bubble 2011.

Figure 20B:
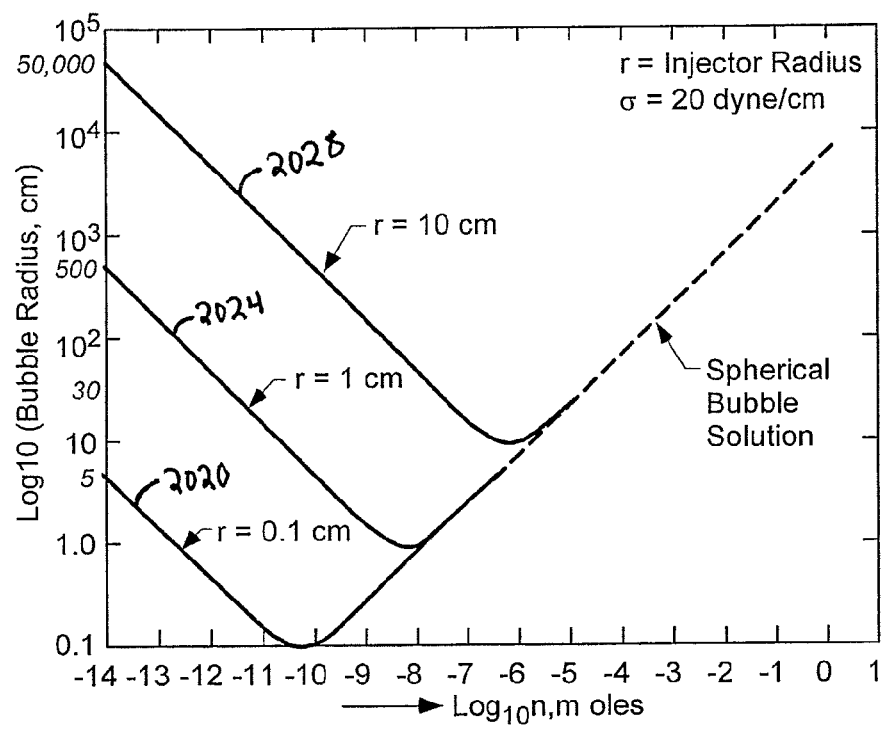
FIG. 20B is a graph of Log of moles of gas contained within an inflating polymer bubble vs. Log of the inflating polymer bubble radius, according to an illustrative embodiment of the invention.

FIG. 20B is a graph of Log of moles of gas contained within an inflating polymer bubble vs. Log of the inflating polymer bubble radius, according to an illustrative embodiment of the invention. The polymer solution used to create the bubbles has a surface tension (σ) of approximately 20 dynes per centimeter. Values for three different injector port radii are plotted. Line 2020 is a plot for an injection port radius of 0.1 centimeters. For example, for a Log m of −13, the Log of the bubble radius is approximately 1.0. Line 2024 is a plot for an injection port radius of 1 centimeter. For example, for a Log m of −12, the Log of the bubble radius is approximately 80. Line 2028 is a plot for an injection port radius of 10 centimeters. For example, for a Log m of −11, the Log of the bubble radius is approximately 1000.

Figure 20C:
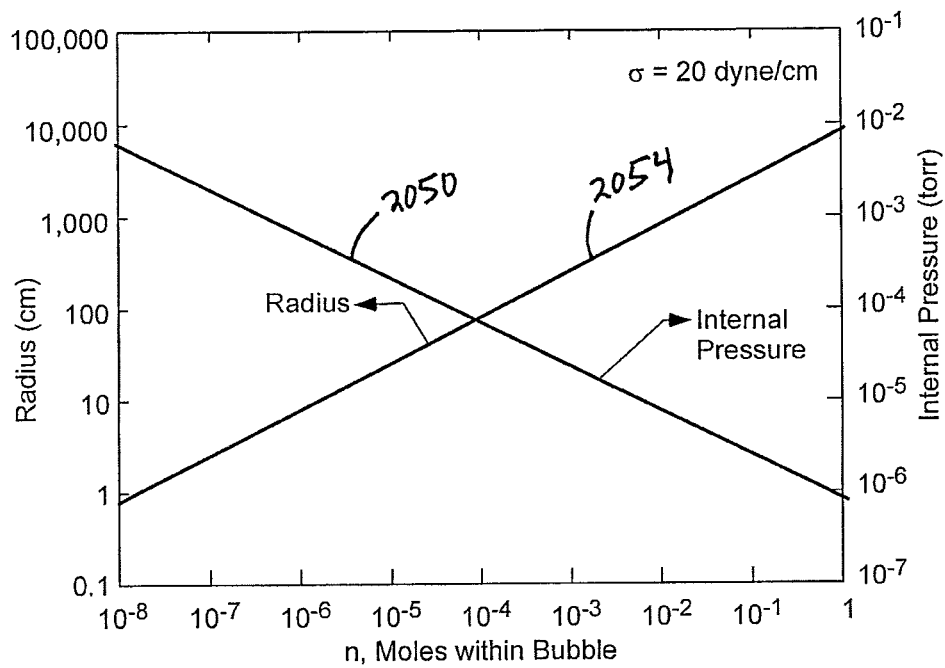
FIG. 20C is a graph of moles of gas contained within an inflating polymer bubble vs. Log of the inflating polymer bubble radius and internal pressure, according to an illustrative embodiment of the invention.

FIG. 20C is a graph of moles of gas contained within an inflating polymer bubble vs. Log of the inflating polymer bubble radius and internal pressure, according to an illustrative embodiment of the invention. The polymer solution used to create the bubbles has a surface tension ($\sigma$) of approximately 20 dynes per centimeter. Line 2050 is a plot of internal pressure as a function of moles of gas contained within the inflating polymer bubble (n). For example, for an n of $10^{-3}$ the internal pressure is approximately $10^{-5}$ Ton. Line 2054 is a plot of bubble radius as a function of n. For example, for an n of $10^{-6}$, the bubble radius is about 10 cm.

Figure 20D:
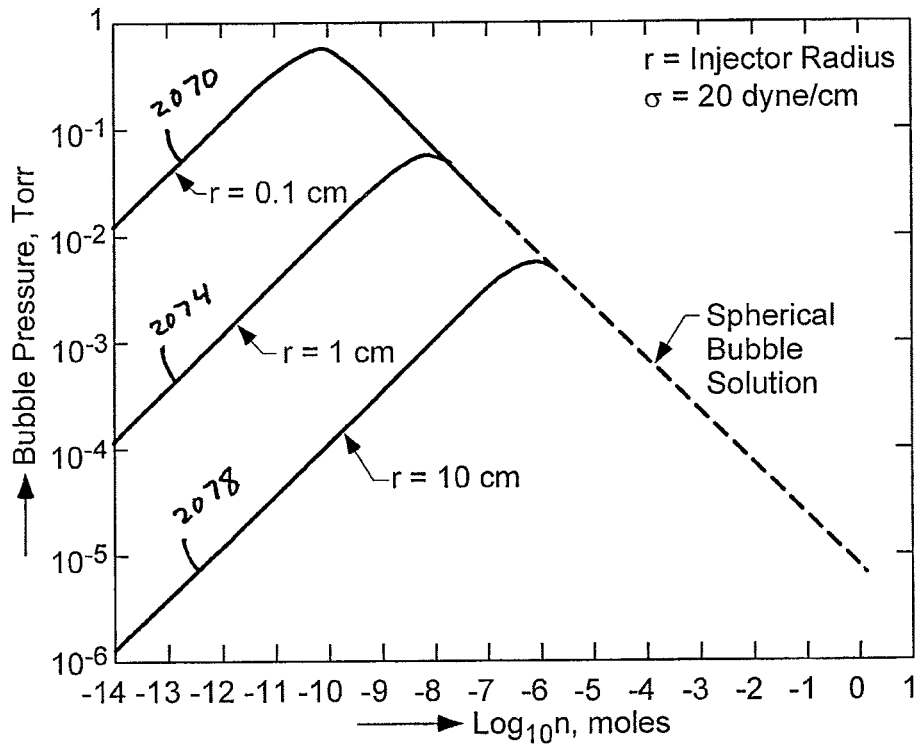
FIG. 20D is a graph of Log of moles of gas contained within an inflating polymer vs. internal bubble pressure, according to an illustrative embodiment of the invention.

FIG. 20D is a graph of Log of moles of gas contained within an inflating polymer vs. internal bubble pressure, according to an illustrative embodiment of the invention. The polymer solution used to create the bubbles has a surface tension ($\sigma$) of approximately 20 dynes per centimeter. Values for three different injector port radii are plotted. Line 2070 is a plot for a bubble radius of 0.1 centimeters. For example, for a Log n of −12, the bubble pressure is about $10^{-1}$ Ton. Line 2074 is a plot for a bubble radius of 1 centimeter. For example, for a Log n of −12, the bubble pressure is about $10^{-3}$ Ton. Line 2078 is a plot for a bubble radius of 10 centimeters. For example, for a Log n of −12, the bubble pressure is about $10^{-5}$ Ton.

Figure 21:
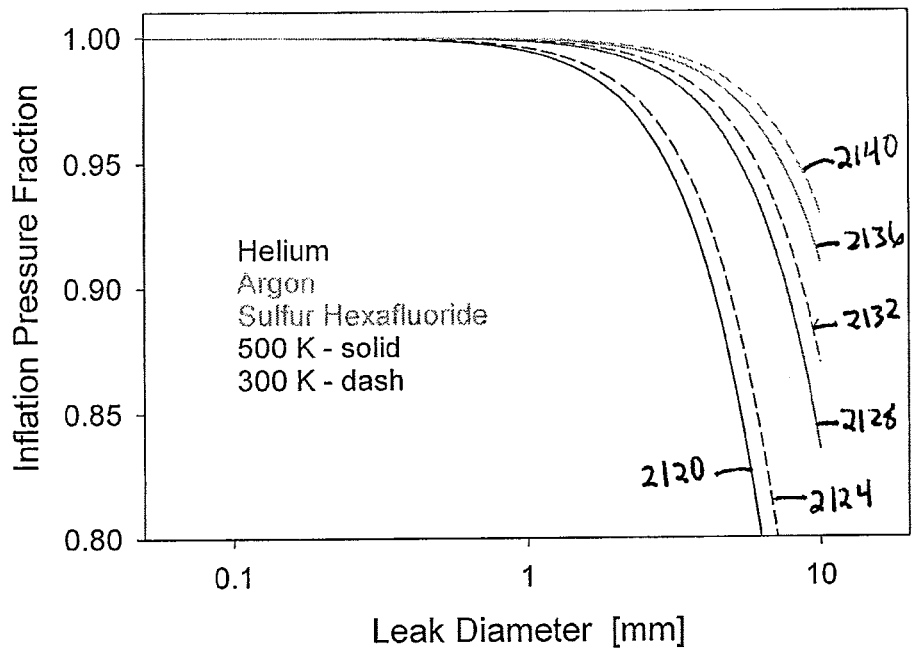
FIG. 21 is a graph of polymer bubble inflation pressure fraction vs. diameter of a leak orifice produced in the polymer bubble as a result of penetration by a micrometeoroid, according to an illustrative embodiment of the invention.

FIG. 21 is a graph of polymer bubble inflation pressure fraction vs. diameter of a leak orifice produced in the polymer bubble as a result of penetration by a micrometeoroid, according to an illustrative embodiment of the invention. More specifically, the fraction of initial inflation pressure remaining is plotted as a function of the leak diameter. Line 2120 is a plot of inflation pressure vs. leak diameter for a liquid polymer bubble filled with helium at 500° K., while line 2124 is a model calculation for helium at 300° K. For example, for a leak diameter of 1 mm, the fraction of pressure remaining after one year is approximately 99% for helium at both 300° K. and 500° K. Line 2128 is a model calculation for argon at 500° K., while line 2132 is a model calculation for argon at 300° K. For example, for a leak diameter of 10 mm, the fraction of pressure remaining after one year for argon is approximately 85% at 500° K. and approximately 87% at 300° K. Line 2136 is a model calculation for sulfur hexafluoride at 500° K., while line 2140 is a model calculation for sulfur hexafluoride at 300° K. For example, for a leak diameter of 10 mm, the fraction of pressure remaining after one year for sulfur hexafluoride after one year is approximately 91% at 500° K. and approximately 93% at 300° K.

The calculations show in FIG. 21 demonstrate the viability of the concept of fabricating RF reflectors in space. Mission life is limited by the durability of the polymer membrane material in the space environment, e.g. by degradation due to atomic oxygen flux in low LEO, absorption of solar UV, ionizing radiation (protons and electrons), and/or micrometeorite or debris penetration in MEO. FIG. 21 demonstrates that for leak diameters of over 1 millimeter the pressure drop over a year can be less than 5 percent of the initial inflation pressure.

Figure 22:
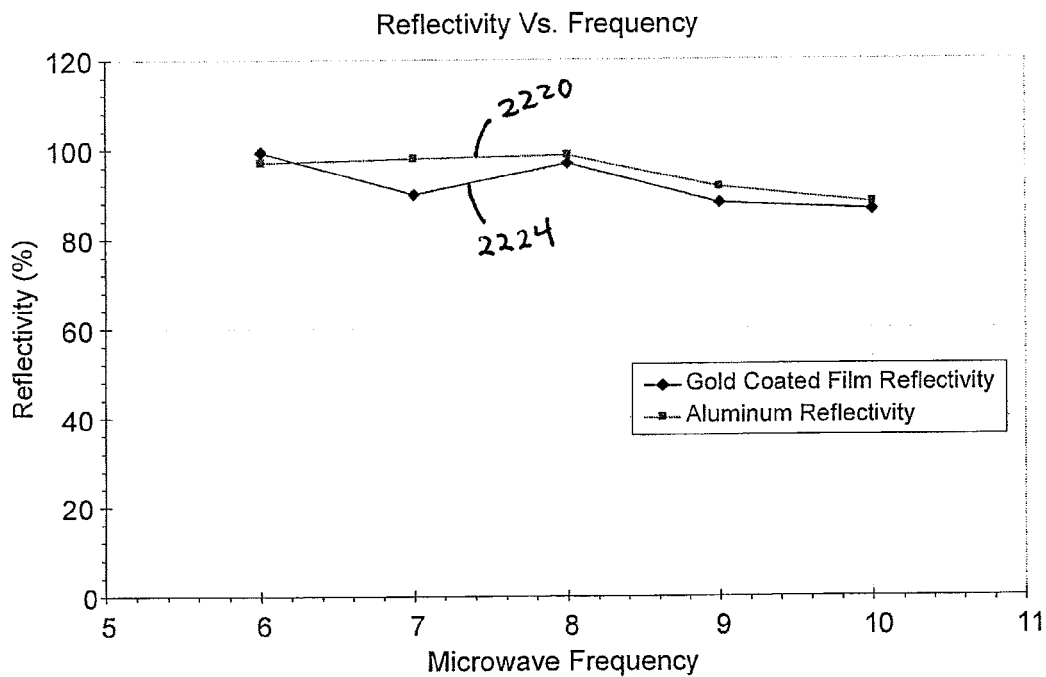
FIG. 22 is a graph of experimentally measured reflectivity vs. microwave frequency for a polymer bubble, according to an illustrative embodiment of the invention.

FIG. 22 is a graph of experimentally measured reflectivity vs. microwave frequency in GHz for polymer bubbles, according to an illustrative embodiment of the invention. The graph shows reflectivity measurements for both a thin film coated with 200 nanometers of gold and for aluminum foil. Reflectivity is plotted as a function of incident frequency. Line 2220 is a plot of the results for aluminum. For example, for a microwave frequency of 7 GHz, the reflectivity of aluminum was approximately 97%. Line 2224 is a plot of the results for gold. For example, for a microwave frequency of 7 GHz, the reflectivity of gold was approximately 89%. The results were obtained using a laboratory system providing radiation in the 6 to 10 GHz frequency range. As the graph shows, reflectivities of greater than 80% can be achieved for both metals for frequencies in the 6 to 10 GHZ range.

The dimensions shown herein are for illustrative purposes only and are not necessarily to scale. It will be apparent to one having ordinary skill in the art that other dimensions can be used without departing from the spirit and scope of the invention.

While the invention has been particularly shown and described with reference to specific illustrative embodiments, it should be understood that various changes in form and detail can be made without departing from the spirit and scope of the invention.

The invention claimed is:

1. A method of forming a metalized polymeric bubble in a space, microgravity environment, the method comprising:
   forming a liquid polymer bubble having a predetermined diameter from a mixture comprising a liquid polymer and at least one of a UV curing material, a stabilizer, a UV absorber, or a surfactant;
   curing the liquid polymer bubble with radiation to form a rigid polymer bubble; and
   metalizing the rigid polymer bubble with a metal to form the metalized polymeric bubble;
   forming another liquid polymer bubble from a mixture comprising at least two of a liquid polymer, a UV curing material, a stabilizer, a UV absorber, or a surfactant;
   intersecting the two liquid polymer bubbles; and
   isolating a surface of intersection between the two liquid polymer bubbles.

2. The method of claim 1 wherein the two bubbles are the same size and the surface of intersection is flat.

3. The method of claim 1 wherein the two bubbles are different sizes and the surface of intersection is spherically curved.

4. The method of claim 1 further comprising passing the liquid polymer bubble through a first ring and passing the other liquid polymer bubble through a second ring located adjacent to the first ring.

5. The method of claim 1 wherein the isolating step comprises passing an electrical current through the first and second rings to excise unneeded portions of the liquid polymer bubbles.

6. The method of claim 1 wherein the two bubbles are formed successively on an inflation assembly with the other liquid polymer bubble formed substantially inside the liquid polymer bubble.

7. The method of claim 6 wherein the inflation pressure within each of the two bubbles is approximately $10^{-6}$ to $10^{-5}$ Torr or less.

8. The method of claim 6 further comprising:
   moving the liquid polymer bubble such that only a portion of the other liquid polymer bubble remains inside the liquid polymer bubble.

9. The method of claim 8 wherein the surface of intersection has a diameter of approximately 100 meters.

10. The method of claim 8 wherein the surface of intersection has a radius of curvature of approximately 150 meters.

11. The method of claim 8 wherein moving the liquid polymer bubble further comprises applying a force around an exterior perimeter of the liquid polymer bubble.

12. The method of claim 11 wherein the force is provided by means of an annular gas jet.

13. The method of claim 8 wherein moving the liquid polymer bubble further comprises rotating the two bubbles at an angular speed.

14. The method of claim 1 wherein metalizing the rigid polymeric bubble comprises metalizing the surface of intersection to form a metalized surface of intersection.

15. The method of claim 14 further comprising using the metalized surface of intersection as a large aperture microwave reflector, as an antenna onboard a satellite, for space optics, as a calibration source for ground sensors, as a calibration source for space sensors, as an optical target, as a solar sail, or as a drag surface for a deorbiting spacecraft.

\* \* \* \* \*